US005974436A

United States Patent [19]

Inoue et al.

[11] Patent Number: 5,974,436

[45] Date of Patent: Oct. 26, 1999

[54] EXECUTION PROCESSOR FOR CARRYING OUT POWER CALCULATION

[75] Inventors: Yoshitsugu Inoue; Hiroyasu Negishi; Keijiro Yoshimatsu; Junko Kobara; Hiroyuki Kawai, all of Hyogo, Japan

[73] Assignee: Mitsubishi Denki Kabushiki Kaisha, Tokyo, Japan

[21] Appl. No.: 08/954,586

[22] Filed: Oct. 20, 1997

[30] Foreign Application Priority Data

Apr. 10, 1997 [JP] Japan .................................... 9-092148

[51] Int. Cl.[6] ....................................................... G06F 7/38

[52] U.S. Cl. ............................................................ 708/606

[58] Field of Search .............................. 364/718.01, 722, 364/752, 753

[56] References Cited

U.S. PATENT DOCUMENTS 4,225,933 9/1980 Monden .................................. 708/606
4,410,956 10/1983 Yoshida .................................. 708/606
4,901,267 2/1990 Birman et al. .......................... 708/513
5,177,702 1/1993 Lindsley ................................. 708/606
5,195,052 3/1993 Karim .................................... 364/606

FOREIGN PATENT DOCUMENTS 58-223847 12/1983 Japan .
5-250146 9/1993 Japan .

OTHER PUBLICATIONS

"*Iwanamikoza Joho Kagaku 10, Fundamental Algorithm*" published by Iwanami Shoten, K. Noshita et al., Apr. 8, 1983, pp. 147–151.

"*Iwanamikoza Joho Kagaku 18, Numerical Computation*". published by Iwanami Shoten, M. Mori et al., Jan. 8, 1982, pp. 29–33.

*Primary Examiner*—Chuong Dinh Ngo
*Attorney, Agent, or Firm*—McDermott, Will & Emery

[57] ABSTRACT

An execution processor that can carry out power calculation at high speed includes a base data register, an exponent data register, a multiplier, a multiplication input selector for selecting an input to the multiplier, first and second registers for storing a calculation result of the multiplier, a square root calculation unit, a square root calculation input selector for selecting an input to the square root calculation unit, a third register for storing a calculation result of the square root calculation unit, and a power calculation controller. The power calculation controller checks the integer region of the exponent data register for each bit while providing input/output control of the multiplication input selector, the first register, and the second register, and checks the decimal fraction region of the exponent data register for each bit to provide input/output control of the square root calculation input selector, the multiplication input selector, the first register, the second register, and the third register.

5 Claims, 30 Drawing Sheets

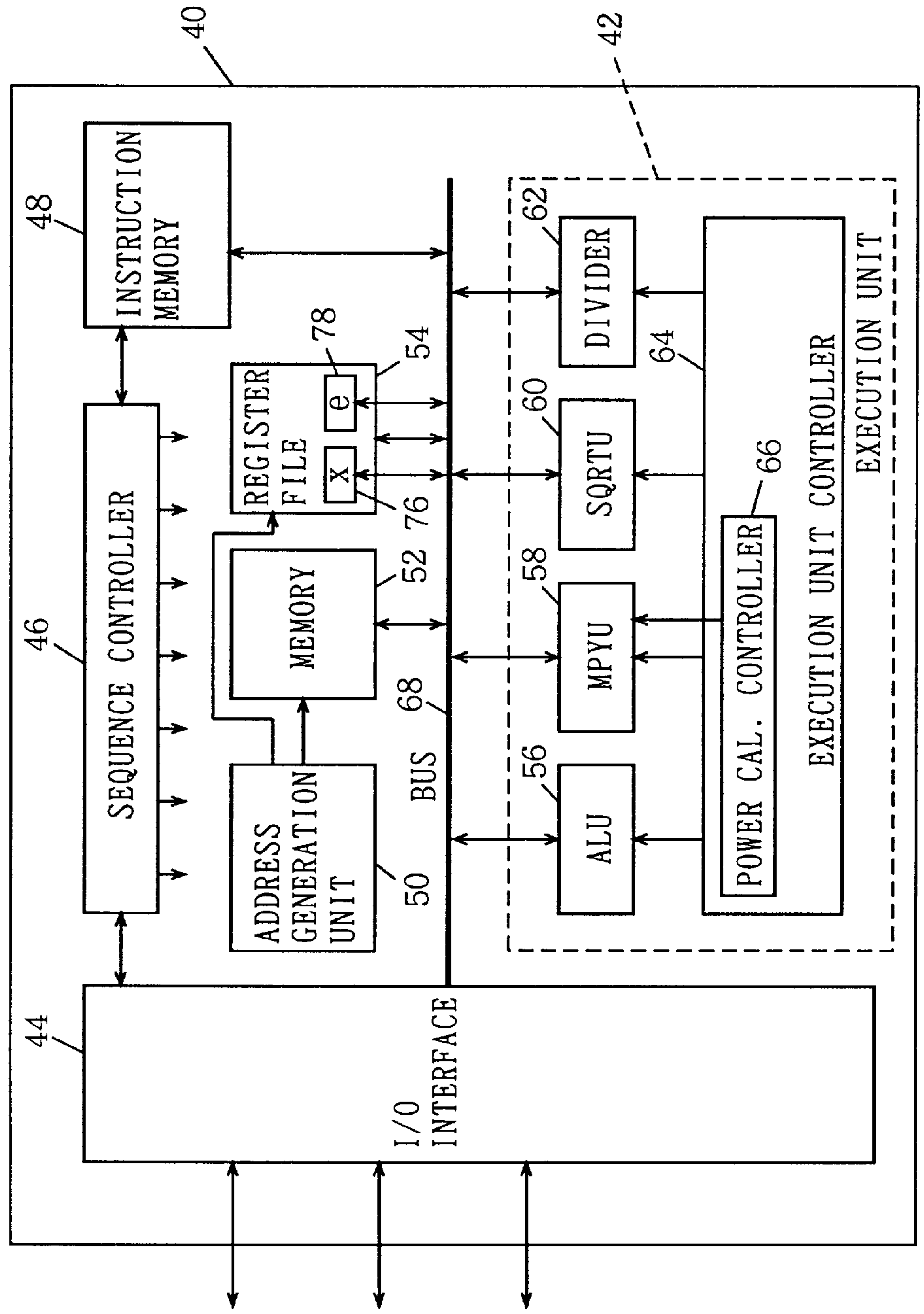
F I G. 4

F I G. 7
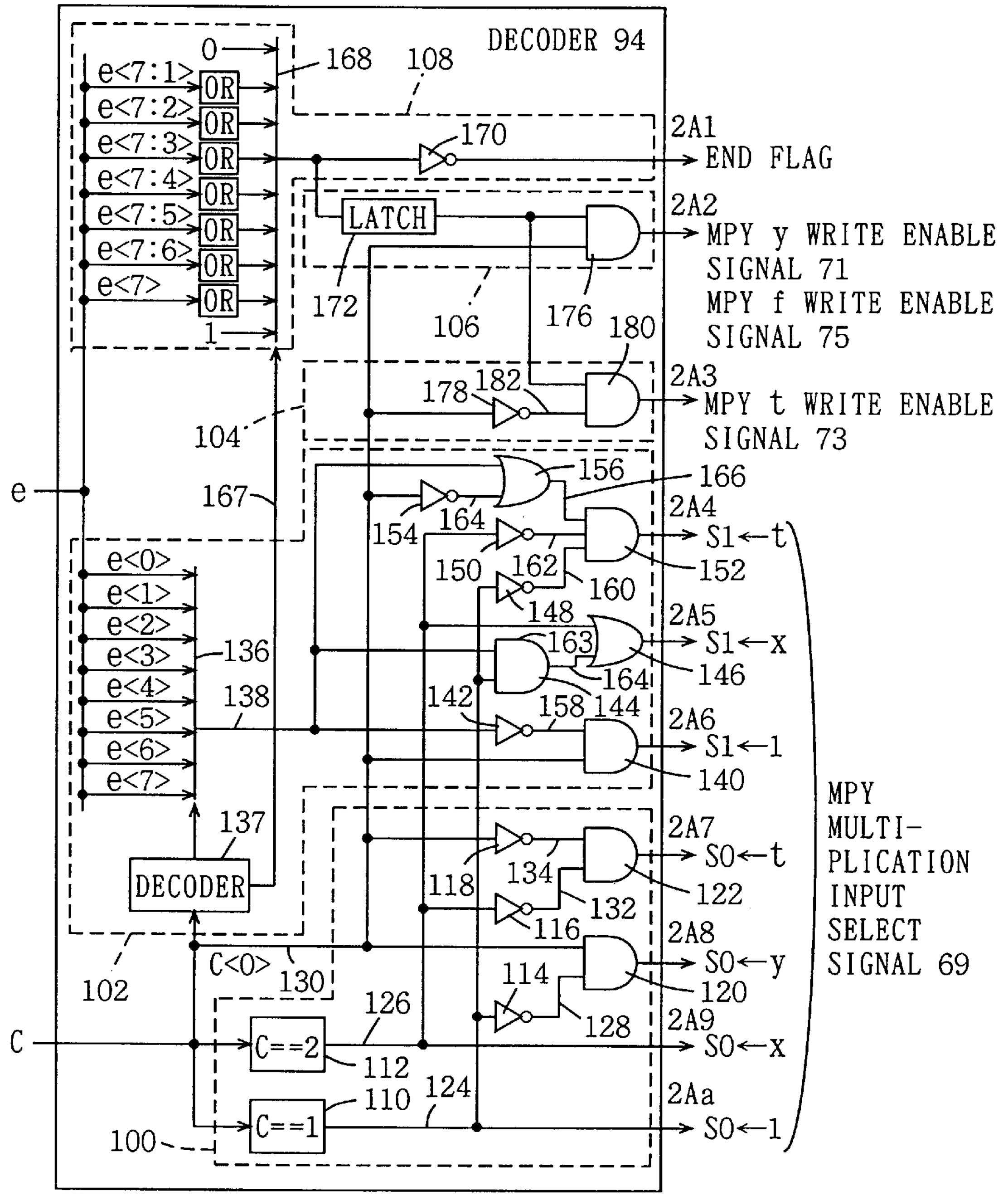

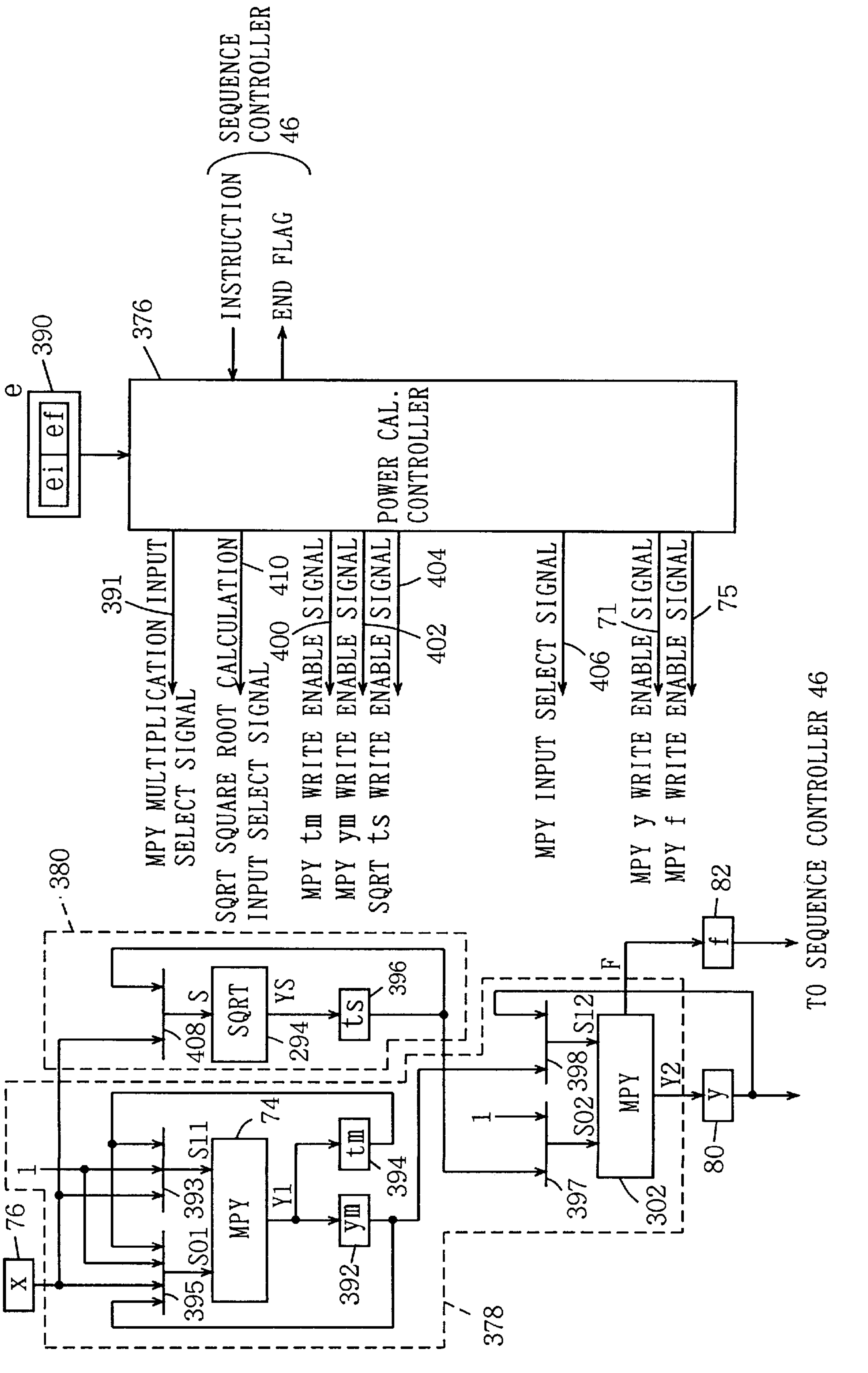
F I G. 1 7

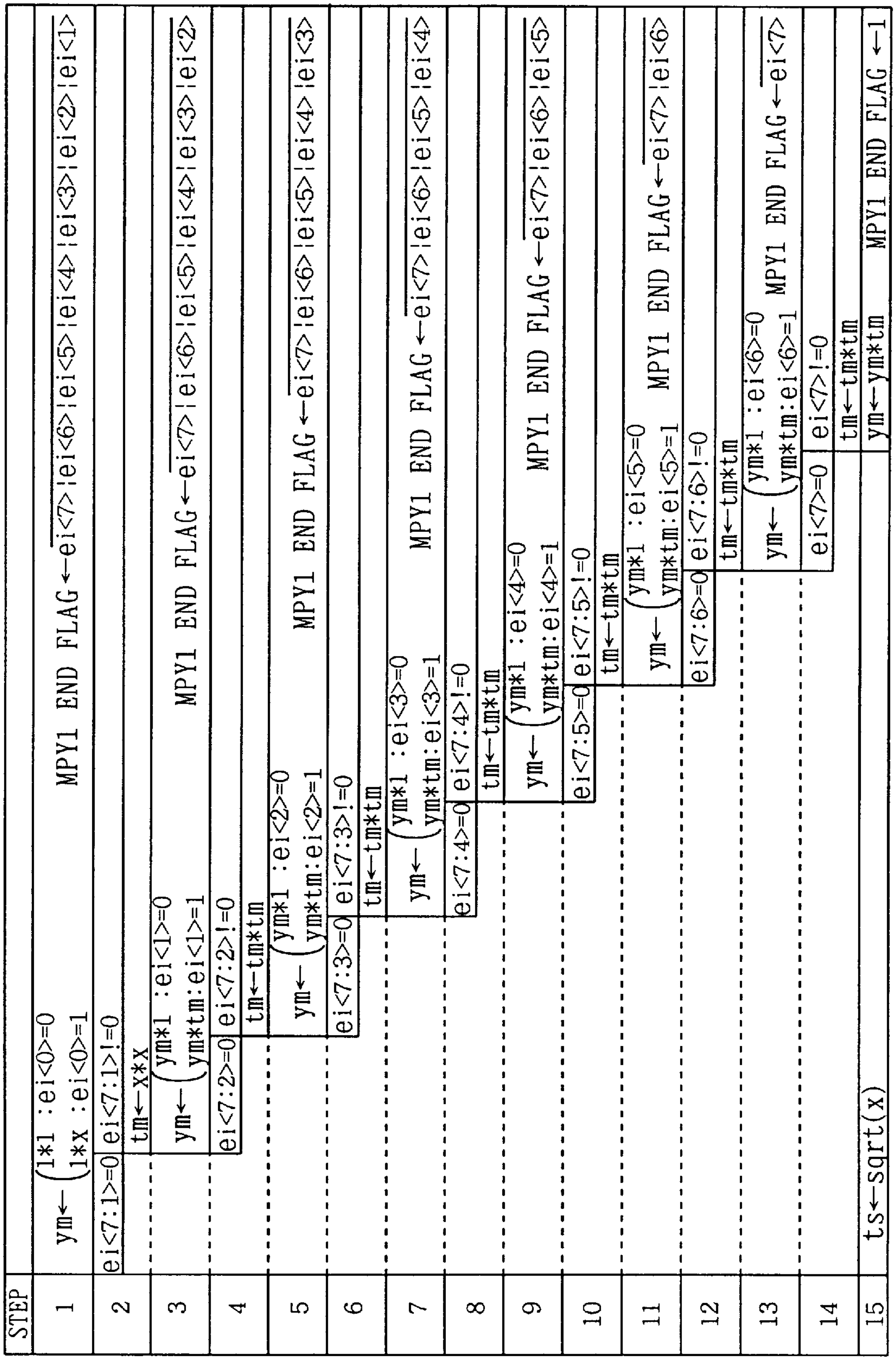

FIG. 19

| STEP | |
|---|---|
| 1 | $ym \leftarrow \begin{pmatrix} 1*1 & : ei<0>=0 \\ 1*x & : ei<0>=1 \end{pmatrix}$     $\overline{MPY1\ END\ FLAG} \leftarrow \overline{ei<7>}|ei<6>|ei<5>|ei<4>|ei<3>|ei<2>|ei<1>$ |
| 2 | ei<7:1>=0   ei<7:1>!=0 |
| 3 | tm←x*x     $ym \leftarrow \begin{pmatrix} ym*1 & : ei<1>=0 \\ ym*tm & : ei<1>=1 \end{pmatrix}$     $\overline{MPY1\ END\ FLAG} \leftarrow \overline{ei<7>}|ei<6>|ei<5>|ei<4>|ei<3>|ei<2>$ |
| 4 | ei<7:2>=0   ei<7:2>!=0 |
| 5 | tm←tm*tm     $ym \leftarrow \begin{pmatrix} ym*1 & : ei<2>=0 \\ ym*tm & : ei<2>=1 \end{pmatrix}$     $\overline{MPY1\ END\ FLAG} \leftarrow \overline{ei<7>}|ei<6>|ei<5>|ei<4>|ei<3>$ |
| 6 | ei<7:3>=0   ei<7:3>!=0 |
| 7 | tm←tm*tm     $ym \leftarrow \begin{pmatrix} ym*1 & : ei<3>=0 \\ ym*tm & : ei<3>=1 \end{pmatrix}$     $\overline{MPY1\ END\ FLAG} \leftarrow \overline{ei<7>}|ei<6>|ei<5>|ei<4>$ |
| 8 | ei<7:4>=0   ei<7:4>!=0 |
| 9 | tm←tm*tm     $ym \leftarrow \begin{pmatrix} ym*1 & : ei<4>=0 \\ ym*tm & : ei<4>=1 \end{pmatrix}$     $\overline{MPY1\ END\ FLAG} \leftarrow \overline{ei<7>}|ei<6>|ei<5>$ |
| 10 | ei<7:5>=0   ei<7:5>!=0 |
| 11 | tm←tm*tm     $ym \leftarrow \begin{pmatrix} ym*1 & : ei<5>=0 \\ ym*tm & : ei<5>=1 \end{pmatrix}$     $\overline{MPY1\ END\ FLAG} \leftarrow \overline{ei<7>}|ei<6>$ |
| 12 | ei<7:6>=0   ei<7:6>!=0 |
| 13 | tm←tm*tm     $ym \leftarrow \begin{pmatrix} ym*1 & : ei<6>=0 \\ ym*tm & : ei<6>=1 \end{pmatrix}$     $\overline{MPY1\ END\ FLAG} \leftarrow \overline{ei<7>}$ |
| 14 | ei<7>=0   ei<7>!=0     tm←tm*tm     ym←ym*tm     $\overline{MPY1\ END\ FLAG} \leftarrow 1$ |
| 15 | ts←sqrt(x) |

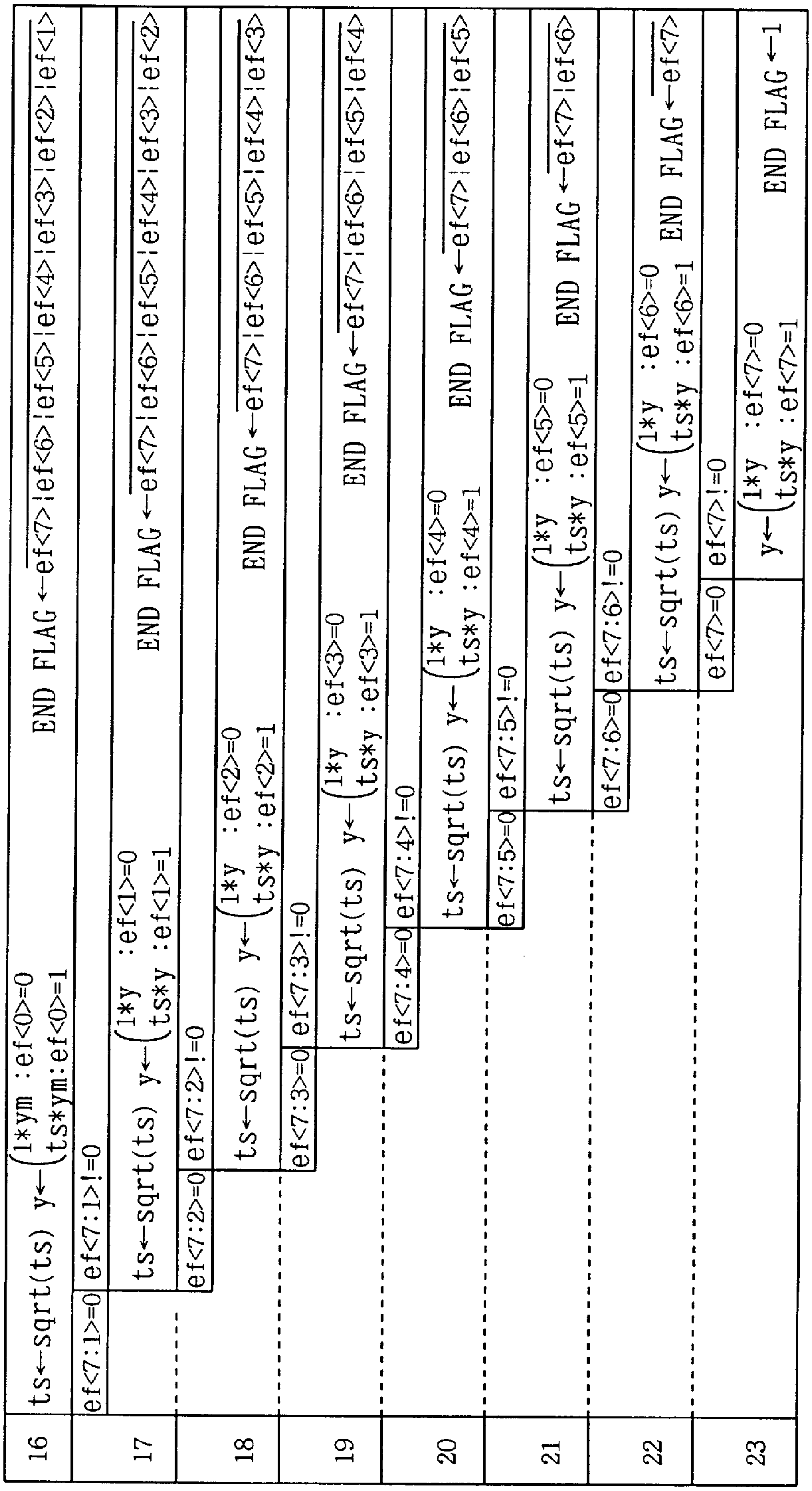

FIG. 20

| 16 | $ts \leftarrow sqrt(ts)$  $y \leftarrow \begin{pmatrix} 1*ym & :ef<0>=0 \\ ts*ym & :ef<0>=1 \end{pmatrix}$ | END FLAG $\leftarrow ef<7>$:ef<6>:ef<5>:ef<4>:ef<3>:ef<2>:ef<1> |
|---|---|---|
| 17 | ef<7:1>=0  ef<7:1>!=0  $ts \leftarrow sqrt(ts)$  $y \leftarrow \begin{pmatrix} 1*y & :ef<1>=0 \\ ts*y & :ef<1>=1 \end{pmatrix}$ | END FLAG $\leftarrow \overline{ef<7>}$:ef<6>:ef<5>:ef<4>:ef<3>:ef<2> |
| 18 | ef<7:2>=0  ef<7:2>!=0  $ts \leftarrow sqrt(ts)$  $y \leftarrow \begin{pmatrix} 1*y & :ef<2>=0 \\ ts*y & :ef<2>=1 \end{pmatrix}$ | END FLAG $\leftarrow \overline{ef<7>}$:ef<6>:ef<5>:ef<4>:ef<3> |
| 19 | ef<7:3>=0  ef<7:3>!=0  $ts \leftarrow sqrt(ts)$  $y \leftarrow \begin{pmatrix} 1*y & :ef<3>=0 \\ ts*y & :ef<3>=1 \end{pmatrix}$ | END FLAG $\leftarrow \overline{ef<7>}$:ef<6>:ef<5>:ef<4> |
| 20 | ef<7:4>=0  ef<7:4>!=0  $ts \leftarrow sqrt(ts)$  $y \leftarrow \begin{pmatrix} 1*y & :ef<4>=0 \\ ts*y & :ef<4>=1 \end{pmatrix}$ | END FLAG $\leftarrow \overline{ef<7>}$:ef<6>:ef<5> |
| 21 | ef<7:5>=0  ef<7:5>!=0  $ts \leftarrow sqrt(ts)$  $y \leftarrow \begin{pmatrix} 1*y & :ef<5>=0 \\ ts*y & :ef<5>=1 \end{pmatrix}$ | END FLAG $\leftarrow \overline{ef<7>}$:ef<6> |
| 22 | ef<7:6>=0  ef<7:6>!=0  $ts \leftarrow sqrt(ts)$  $y \leftarrow \begin{pmatrix} 1*y & :ef<6>=0 \\ ts*y & :ef<6>=1 \end{pmatrix}$ | END FLAG $\leftarrow \overline{ef<7>}$ |
| 23 | ef<7>=0  ef<7>!=0  $y \leftarrow \begin{pmatrix} 1*y & :ef<7>=0 \\ ts*y & :ef<7>=1 \end{pmatrix}$ | END FLAG $\leftarrow 1$ |

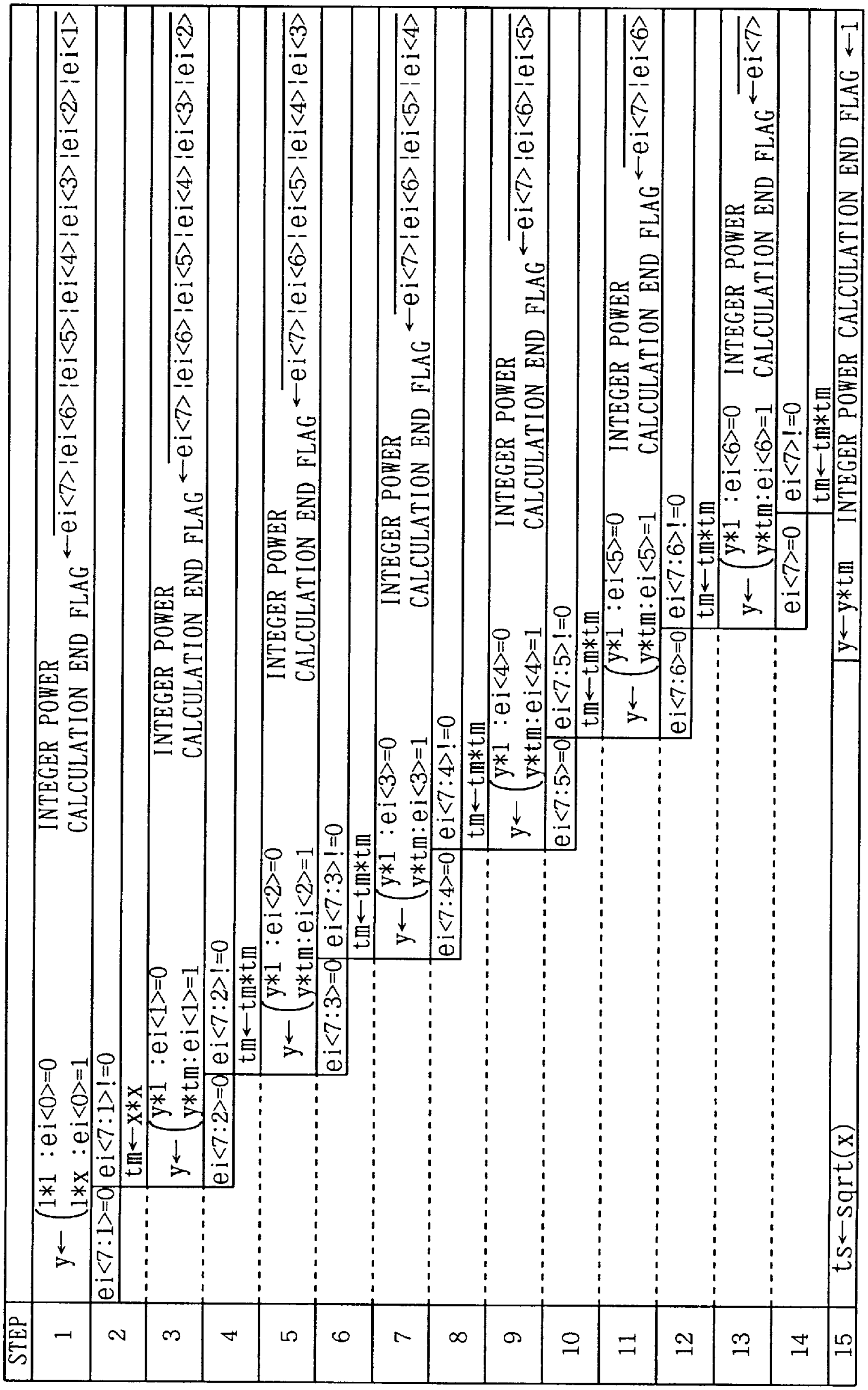

FIG. 23

| STEP | |
|---|---|
| 1 | $y \leftarrow \begin{pmatrix} 1*1 &: ei<0>=0 \\ 1*x &: ei<0>=1 \end{pmatrix}$  INTEGER POWER CALCULATION END FLAG $\leftarrow \overline{ei<7>|ei<6>|ei<5>|ei<4>|ei<3>|ei<2>|ei<1>}$ |
| 2 | ei<7:1>=0 ei<7:1>!=0 |
| 3 | tm←x*x |
| 4 | $y \leftarrow \begin{pmatrix} y*1 &: ei<1>=0 \\ y*tm &: ei<1>=1 \end{pmatrix}$  INTEGER POWER CALCULATION END FLAG $\leftarrow \overline{ei<7>|ei<6>|ei<5>|ei<4>|ei<3>|ei<2>}$ |
| 5 | ei<7:2>=0 ei<7:2>!=0 |
| 6 | tm←tm*tm |
| 7 | $y \leftarrow \begin{pmatrix} y*1 &: ei<2>=0 \\ y*tm &: ei<2>=1 \end{pmatrix}$  INTEGER POWER CALCULATION END FLAG $\leftarrow \overline{ei<7>|ei<6>|ei<5>|ei<4>|ei<3>}$ |
| 8 | ei<7:3>=0 ei<7:3>!=0 |
| 9 | tm←tm*tm |
| 10 | $y \leftarrow \begin{pmatrix} y*1 &: ei<3>=0 \\ y*tm &: ei<3>=1 \end{pmatrix}$  INTEGER POWER CALCULATION END FLAG $\leftarrow \overline{ei<7>|ei<6>|ei<5>|ei<4>}$ |
| 11 | ei<7:4>=0 ei<7:4>!=0 |
| 12 | tm←tm*tm |
| 13 | $y \leftarrow \begin{pmatrix} y*1 &: ei<4>=0 \\ y*tm &: ei<4>=1 \end{pmatrix}$  INTEGER POWER CALCULATION END FLAG $\leftarrow \overline{ei<7>|ei<6>|ei<5>}$ |
| 14 | ei<7:5>=0 ei<7:5>!=0 |
| 15 | tm←tm*tm |
| 16 | $y \leftarrow \begin{pmatrix} y*1 &: ei<5>=0 \\ y*tm &: ei<5>=1 \end{pmatrix}$  INTEGER POWER CALCULATION END FLAG $\leftarrow \overline{ei<7>|ei<6>}$ |
| 17 | ei<7:6>=0 ei<7:6>!=0 |
| 18 | tm←tm*tm |
| 19 | $y \leftarrow \begin{pmatrix} y*1 &: ei<6>=0 \\ y*tm &: ei<6>=1 \end{pmatrix}$  INTEGER POWER CALCULATION END FLAG $\leftarrow \overline{ei<7>}$ |
| 20 | ei<7>=0 ei<7>!=0 |
| 21 | tm←tm*tm |
| 22 | y←y*tm  INTEGER POWER CALCULATION END FLAG ←1 |
| 23 | ts←sqrt(x) |

(Note: step numbering in image shows 1–15; re-rendered to match visible rows.)

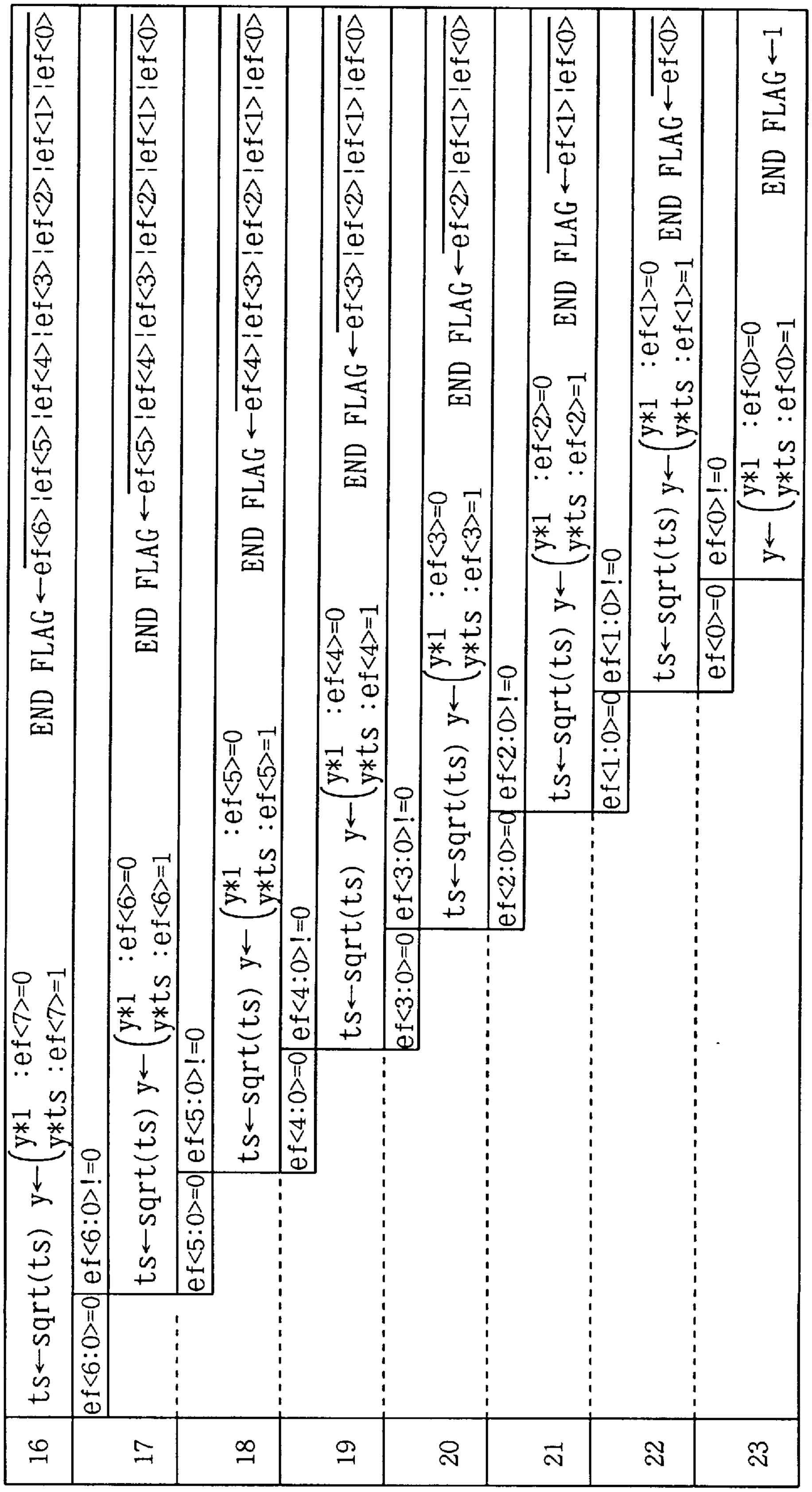

FIG. 24

| 16 | ts←sqrt(ts) y←$\binom{y*1 \quad :ef<7>=0}{y*ts :ef<7>=1}$ | END FLAG←$\overline{ef<6>}$:ef<5>:ef<4>:ef<3>:ef<2>:ef<1>:ef<0> |
|---|---|---|
| 17 | ef<6:0>=0  ef<6>!=0 | |
|  | ts←sqrt(ts) y←$\binom{y*1 \quad :ef<6>=0}{y*ts :ef<6>=1}$ | END FLAG←$\overline{ef<5>}$:ef<4>:ef<3>:ef<2>:ef<1>:ef<0> |
| 18 | ef<5:0>=0  ef<5:0>!=0 | |
|  | ts←sqrt(ts) y←$\binom{y*1 \quad :ef<5>=0}{y*ts :ef<5>=1}$ | END FLAG←$\overline{ef<4>}$:ef<3>:ef<2>:ef<1>:ef<0> |
| 19 | ef<4:0>=0  ef<4:0>!=0 | |
|  | ts←sqrt(ts) y←$\binom{y*1 \quad :ef<4>=0}{y*ts :ef<4>=1}$ | END FLAG←$\overline{ef<3>}$:ef<2>:ef<1>:ef<0> |
| 20 | ef<3:0>=0  ef<3:0>!=0 | |
|  | ts←sqrt(ts) y←$\binom{y*1 \quad :ef<3>=0}{y*ts :ef<3>=1}$ | END FLAG←$\overline{ef<2>}$:ef<1>:ef<0> |
| 21 | ef<2:0>=0  ef<2:0>!=0 | |
|  | ts←sqrt(ts) y←$\binom{y*1 \quad :ef<2>=0}{y*ts :ef<2>=1}$ | END FLAG←$\overline{ef<1>}$:ef<0> |
| 22 | ef<1:0>=0  ef<1:0>!=0 | |
|  | ts←sqrt(ts) y←$\binom{y*1 \quad :ef<1>=0}{y*ts :ef<1>=1}$ | END FLAG←$\overline{ef<0>}$ |
| 23 | ef<0>=0  ef<0>!=0 | |
|  | y←$\binom{y*1 \quad :ef<0>=0}{y*ts :ef<0>=1}$ | END FLAG←1 |

F I G. 2 8
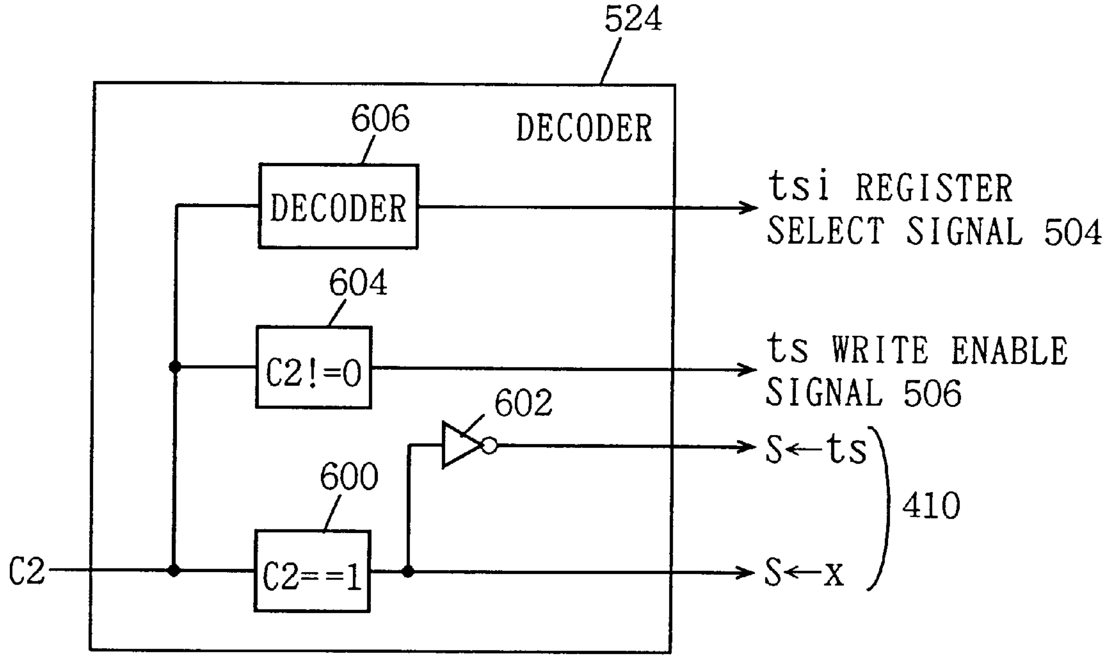

FIG. 29

| STEP | MPY | SQRT | |
|---|---|---|---|
| 1 | y← 1*1 :ei<0>=0<br>y← 1*x :ei<0>=1 | ts←sqrt(x) | |
| 2 | tm←x*x | ts←sqrt(ts) | ts0←ts |
| 3 | y← y*1 :ei<1>=0<br>y← y*tm :ei<1>=1 | ts←sqrt(ts) | ts1←ts |
| 4 | tm←tm*tm | ts←sqrt(ts) | ts2←ts |
| 5 | y← y*1 :ei<2>=0<br>y← y*tm :ei<2>=1 | ts←sqrt(ts) | ts3←ts |
| 6 | tm←tm*tm | ts←sqrt(ts) | ts4←ts |
| 7 | y← y*1 :ei<3>=0<br>y← y*tm :ei<3>=1 | ts←sqrt(ts) | ts5←ts |
| 8 | tm←tm*tm | ts←sqrt(ts) | ts6←ts |
| 9 | y← y*1 :ei<4>=0<br>y← y*tm :ei<4>=1 | | ts7←ts |
| 10 | tm←tm*tm | | |
| 11 | y← y*1 :ei<5>=0<br>y← y*tm :ei<5>=1 | | |
| 12 | tm←tm*tm | | |
| 13 | y← y*1 :ei<6>=0<br>y← y*tm :ei<6>=1 | | |
| 14 | tm←tm*tm | | |
| 15 | y← y*1 :ei<7>=0<br>y← y*tm :ei<7>=1 | | |
| 16 | y← y*1 :ef<7>=0<br>y← y*ts0:ef<7>=1 | | |
| 17 | y← y*1 :ef<6>=0<br>y← y*ts1:ef<6>=1 | | |
| 18 | y← y*1 :ef<5>=0<br>y← y*ts2:ef<5>=1 | | |
| 19 | y← y*1 :ef<4>=0<br>y← y*ts3:ef<4>=1 | | |
| 20 | y← y*1 :ef<3>=0<br>y← y*ts4:ef<3>=1 | | |
| 21 | y← y*1 :ef<2>=0<br>y← y*ts5:ef<2>=1 | | |
| 22 | y← y*1 :ef<1>=0<br>y← y*ts6:ef<1>=1 | | |
| 23 | y← y*1 :ef<0>=0<br>y← y*ts7:ef<0>=1 | | |

FIG. 30

| STEP | MPY | SQRT | |
|---|---|---|---|
| 1 | y← 1*1 :ei<0>=0<br>y← 1*x :ei<0>=1 | ts←sqrt(x) | |
| 2 | tm←x*x | | |
| 3 | y← y*1 :ei<1>=0<br>y← y*tm :ei<1>=1 | ts←sqrt(ts) | ts0←ts |
| 4 | tm←tm*tm | | |
| 5 | y← y*1 :ei<2>=0<br>y← y*tm :ei<2>=1 | ts←sqrt(ts) | ts1←ts |
| 6 | tm←tm*tm | | |
| 7 | y← y*1 :ei<3>=0<br>y← y*m :ei<3>=1 | ts←sqrt(ts) | ts2←ts |
| 8 | tm←tm*tm | | |
| 9 | y← y*1 :ei<4>=0<br>y← y*tm :ei<4>=1 | ts←sqrt(ts) | ts3←ts |
| 10 | tm←tm*tm | | |
| 11 | y← y*1 :ei<5>=0<br>y← y*tm :ei<5>=1 | ts←sqrt(ts) | ts4←ts |
| 12 | tm←tm*tm | | |
| 13 | y← y*1 :ei<6>=0<br>y← y*tm :ei<6>=1 | ts←sqrt(ts) | ts5←ts |
| 14 | tm←tm*tm | | |
| 15 | y← y*1 :ei<7>=0<br>y← y*tm :ei<7>=1 | ts←sqrt(ts) | ts6←ts |
| 16 | y← y*1 :ef<7>=0<br>y← y*ts0:ef<7>=1 | | |
| 17 | y← y*1 :ef<6>=0<br>y← y*ts1:ef<6>=1 | | ts0←ts |
| 18 | y← y*1 :ef<5>=0<br>y← y*ts2:ef<5>=1 | | |
| 19 | y← y*1 :ef<4>=0<br>y← y*ts3:ef<4>=1 | | |
| 20 | y← y*1 :ef<3>=0<br>y← y*ts4:ef<3>=1 | | |
| 21 | y← y*1 :ef<2>=0<br>y← y*ts5:ef<2>=1 | | |
| 22 | y← y*1 :ef<1>=0<br>y← y*ts6:ef<1>=1 | | |
| 23 | y← y*1 :ef<0>=0<br>y← y*ts0:ef<0>=1 | | |

EXECUTION PROCESSOR FOR CARRYING OUT POWER CALCULATION

BACKGROUND OF THE INVENTION

1. Field of the Invention

The present invention relates to execution processors for carrying out power calculation of numerals, and more particularly, to an execution processor using a multiplier and a square root calculation unit incorporated in the processor.

2. Description of the Background Art

In carrying out numerical calculation with a computer, the hardware such as of an arithmetic logic unit and a multiplier are prepared. Numerical calculation of a high level is carried out by executing a program which is a combination of the basic computation features of the units.

Conventional art 1: For example, a method of obtaining the eth power (e is an integer) of x, $x^e$ is disclosed in "Iwanamikouza Jouhoukagaku 10 Kihontekisanpou" (Iwanami Course Information Science 10 Fundamental Algorithm), pp. 147–151, Iwanamishoten. This method will be described hereinafter with reference to FIG. 1.

Let the binary representation of e be:

$e=b_{m-1}\ b_{m-2}\ \ldots\ b_0$ (m>1, i=0, 1, $b_{m-1}=1$)

The variable y indicating the result is set as y=x, and the variable i indicating the bit to be checked is set as i=m−2 (S22). When i is a negative numeral (FALSE in S24), the process ends since there is no data of that bit. When the data of that bit is present (TRUE at S24), y is substituted with $y^2$ (S26). When $b_i=1$ (TRUE at S28), y is further substituted with y×x (S30). When $b_i=0$ (FALSE at S28), no action is taken. According to the process of S26 to S30, y is substituted with $y^2\times x$ and $y^2$ when $b_i=1$ and $b_i=0$, respectively. The value of i is decremented by 1 (S32), and the process from S26 to S30 is carried out until i=0. Thus, the power calculation result $x^e$ of an integer exponent is obtained.

Conventional art 2: A method of obtaining the eth power (e is a real number) of x, $x^e$ is disclosed in "Iwanamikouza Jouhoukagaku 18 Suuchikeisan" (Iwanami Course Information Science 18 Numeric Computation), pp. 29–32 by Iwanamishoten. This method will be described hereinafter with reference to FIGS. 2 and 3.

The following notation can be provided.

$x^e=\exp(e\times\log(x))$

By preparing a software library function of the logarithmitic function (log) and exponential function (exp), $x^e$ can be obtained.

The value of obtaining the logarithmitic function of z=log (y) of n-bit precision will be described with reference to FIG. 2. It is assumed that the value of $-\log(1+2^{-k})$(k=1, 2, . . . , n) is prepared in advance as a constant. First, $y_0=y$, $z_0=0$, and k=1 are set (S42). The process set forth in the following is carried out by altering the value of k from 1 to n. When the value of k is n or smaller (TRUE in S44), the following is obtained (S46).

$$w=yk-1\times(1+2^{-k})$$

When w≧1 (TRUE in S48), yk=yk−1, $z_k=z_{k-1}$ are set (S50). When w<1 (FALSE at S48), $y_k$=w, $z_k=z_{k-1}-\log(1+2^{-k})$ are set (S52). Then, the value of k is incremented by 1 (S54). This process of S44–S54 is repeated. When the value of k becomes greater than n (FALSE at S44), the process ends. The current $z_k$ is the value to be obtained.

The method of obtaining the exponential function y=exp (z) of n-bit precision will be described with reference to FIG. 30. It is assumed that the value of $-\log(1+2^{-k})$ (k=1, 2, . . . , n) is prepared in advance as a constant. First, $y_0=1$, $z_0=z$, and k=1 are set (S62). The process set forth in the following is carried out by altering the value of k from 1 to n. When the value of k is n or smaller (TRUE at S64), the following is obtained (S66).

$$w=z_{k-1}-\log(1+2^{-k})$$

When w≧0 (TRUE at S68), $Y_k=Y_{k-1}\times(1+2^{-k})$, $z_k$=w are set (S70). When w<0 (FALSE at S68), $Y_k=Y_{k-1}$, $z_k-z_{k-1}$ are set (S72). Then, the value of k is incremented by 1 (S74). The process from S64–S74 is repeated. When the value of k becomes greater than n (FALSE at S64), the process is terminated. The current $y_k$ is the value to be obtained.

According to the computer executing the power calculation of the integer exponent in conventional art 1, multiplication is carried out (2m−1) times. However, the process according to software requires operation for control other than for multiplication, such as bit determination as shown in S28 of FIG. 1, loop control, and the detection of the most significant bit of 1 in the register storing the exponent. There was a problem that this process is time consuming.

In the computer for executing the power calculation of a real number exponent according to conventional art 2, a memory region for storing in advance the value of $-\log(1+2^{-k})$ (k=1, 2, . . . , n) as a constant is necessary. Furthermore, there was a problem that the total time for processing is extremely great since the process for calculating the exponential function is time consuming.

SUMMARY OF THE INVENTION

In view of the foregoing, an object of the present invention is to provide an execution processor that can carry out power calculation of an integer exponent at high speed with few additional circuits to a multiplier.

Another object of the present invention is to provide an execution processor that can carry out power calculation of a decimal exponent at high speed.

A further object of the present invention is to provide an execution processor that can carry out power calculation of a real number exponent at high speed.

Still another object of the present invention is to provide an execution processor that can provide a flag report such as to as a sequence controller properly and quickly.

Still another object of the present invention is to provide an execution processor that can notify that the calculation result of a multiplier is 0, and/or exceeds the data region of the representation range to a sequence controller and the like properly and quickly.

A still further object of the present invention is to provide an execution processor that can carry out power calculation at high speed without any extra calculation.

An execution processor according to an aspect of the present invention includes a first register for storing base data, a second register for storing exponent data, a multiplier with first and second inputs, third and fourth registers for storing calculation results of the multiplier, a first input selector receiving an output of the first register, an output of the third register, an output of the fourth register and a fixed value 1 for selecting one thereof according to a first input select signal and providing the same to the first input of the multiplier, a second input selector receiving an output of the first register, an output of the fourth register, and a fixed value 1 for selecting one thereof according to a second input select signal and providing the same to the second input of the multiplier, and a power calculation controller for checking exponent data for each bit while providing the first input select signal, the second input select signal, and a write enable signal for allowing data writing to the third or fourth register in a predetermined sequence according to the number of checking times and the value of a relevant bit.

The execution processor of the present aspect stores an intermediate result in the third register, and the value of a power of the base data in the fourth register. The bit of the value of the integer exponent stored in the second register is sequentially checked from the LSB (Least Significant Bit) and input selection to the multiplier is effected to carry out power calculation of the integer exponent. Thus, power calculation of integer exponent can be carried out at high speed with few additional circuits to the multiplier.

Preferably, the multiplier includes a former half multiplier for carrying out a former half of a multiplication process, and a latter half multiplier for carrying out a latter half of a multiplication process. The power calculation controller provides the first input select signal, the second input select signal, and the write enable signal so that a latter half of a certain multiplication process and a former half of an immediate succeeding multiplication process are carried out in parallel.

According to the present aspect of the invention, a multiplier of a two-stage pipeline structure is provided. The latter half of a certain multiplication and a former half of an immediate succeeding multiplication are carried out in parallel. As a result, the cycle of obtaining an execution result of multiplication is shortened. Therefore, the power calculation can further be speeded to carry out power calculation of an integer exponent at high speed.

According to another aspect of the present invention, an execution processor includes a first register for storing base data, a second register for storing exponent data, a square root calculation unit, a third register for storing a calculation result of the square root calculation unit, a multiplier with first and second inputs, a fourth register for storing a calculated result of the multiplier, a first input selector receiving an output of the first register and an output of the third register for selecting and providing to the input of the square root calculation unit either output of the first and third registers according to a first input select signal, a second input selector receiving an output of the third register and a fixed value 1 for selecting either received input and providing the same to the first input of the multiplier according to a second input select signal, a third input selector receiving an output of the fourth register and a fixed value 1 for selecting one of the received input and providing the same to the second input of the multiplier according a third input select signal, and a power calculation controller for checking the exponent data for each bit while providing in a predetermined sequence the first input select signal, the second input select signal, the third input select signal, and the write enable signal for allowing data writing to the third or fourth register according to the number of checking times and the value of a relevant bit.

According to the present aspect, the power root of the base data calculated by the square root calculation unit is stored in the third register, and an intermediate result is stored in the fourth register. By sequentially checking the bit of the values of the decimal exponent stored in the second register from the LSB, and effecting input selection to the multiplier, the power calculation of a decimal exponent is carried out. Thus, the power calculation of a decimal exponent can be carried out at high speed.

According to a further aspect of the present invention, an execution processor includes a first register for storing base data, a second register for dividing and storing exponent data into an integer region and a decimal fraction region, a multiplier with first and second inputs, third and fourth registers for storing calculated results of the multiplier, a square root calculation unit, a fifth register for storing a calculated result of the square root calculation unit, a first input selector receiving an output of the first register, an output of the third register, an output of the fourth register, and a fixed value 1 for selecting any one of the received outputs according to a first input select signal and providing the same to the first input of the multiplier, a second input selector receiving an output of the first register, an output of the fourth register, an output of the fifth register, and a fixed value 1 for selecting any one of the received outputs according to a second input select signal and providing the same to the second input of the multiplier, a third input selector for receiving an output of first register and an output of the fifth register for selecting one of the received outputs according to a third input select signal and providing the same to the input of the square root calculation unit, and a power calculation controller for checking the integer region of the exponent data for each bit while providing the first input select signal, the second input select signal, and a write enable signal for allowing data writing to the third or fourth register according to the number of checking times and value of a relevant bit, and for checking the decimal fraction region of the exponent data for each bit and providing the first input select signal, the second input select signal, the third input select signal, and the write enable signal for allowing data writing to the third or fifth register according to the number of checking times and value of a relevant bit.

According to the present aspect of the invention, the intermediate result of the power calculation is stored in the third register, the value of the base data raised to the power is stored in the fourth data, and the value of the power root of the base data is stored in the fourth register. By sequentially checking the bit of the value of the integer region of the exponent data stored in the second register from the LSB, and effecting input selection of the multiplier, power calculation of an integer exponent is carried out. Also, by sequentially checking the bit of the value of the decimal fraction region of the exponent data stored in the second register from the LSB and effecting input selection of the multiplier, power calculation of a decimal exponent is carried out. Furthermore, power calculation of a real number exponent is carried out by multiplying the power calculation result of the integer exponent and the power calculation result of the decimal exponent in the multiplier. Thus, power calculation of a real number exponent can be carried out at high speed.

Preferably, the multiplier further includes a status register for further providing flag data indicating the status of the calculated result of the multiplier, and storing the flag data. The power calculation controller provides write control of the flag data output from the multiplier to the status register.

According to the present invention, the multiplier provides flag data indicating the status of the calculated result. Thus, a flag report can be provided to a sequence controller and the like properly and quickly.

Further preferably, the power calculation controller terminates the process when the result of a predetermined calculation between predetermined bits of the exponent data is a predetermined value, and provides flag data indicating termination of the process.

According to the present aspect of the invention, power calculation can be carried out at high speed with few additional circuits to the multiplier without any extra calculation.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram of an execution processor 40 according to a first embodiment of the present invention.

FIG. 7 is a logic circuit diagram of a decoder 94 according to the first embodiment of the present invention.

FIG. 17 is a block diagram of an execution unit 372 according to a fourth embodiment of the present invention.

FIGS. 19 and 20 are flow charts of a power calculation process according to the fourth embodiment of the present invention.

FIGS. 23 and 24 are flow charts of a power calculation process according to the fifth embodiment of the present invention.

FIG. 28 is a logic circuit diagram of a decoder 524 according to the sixth embodiment of the present invention.

FIGS. 29 and 30 are flow charts of a power calculation process according to the sixth embodiment of the present invention.

DESCRIPTION OF THE PREFERRED EMBODIMENTS

First Embodiment

Figure 1:
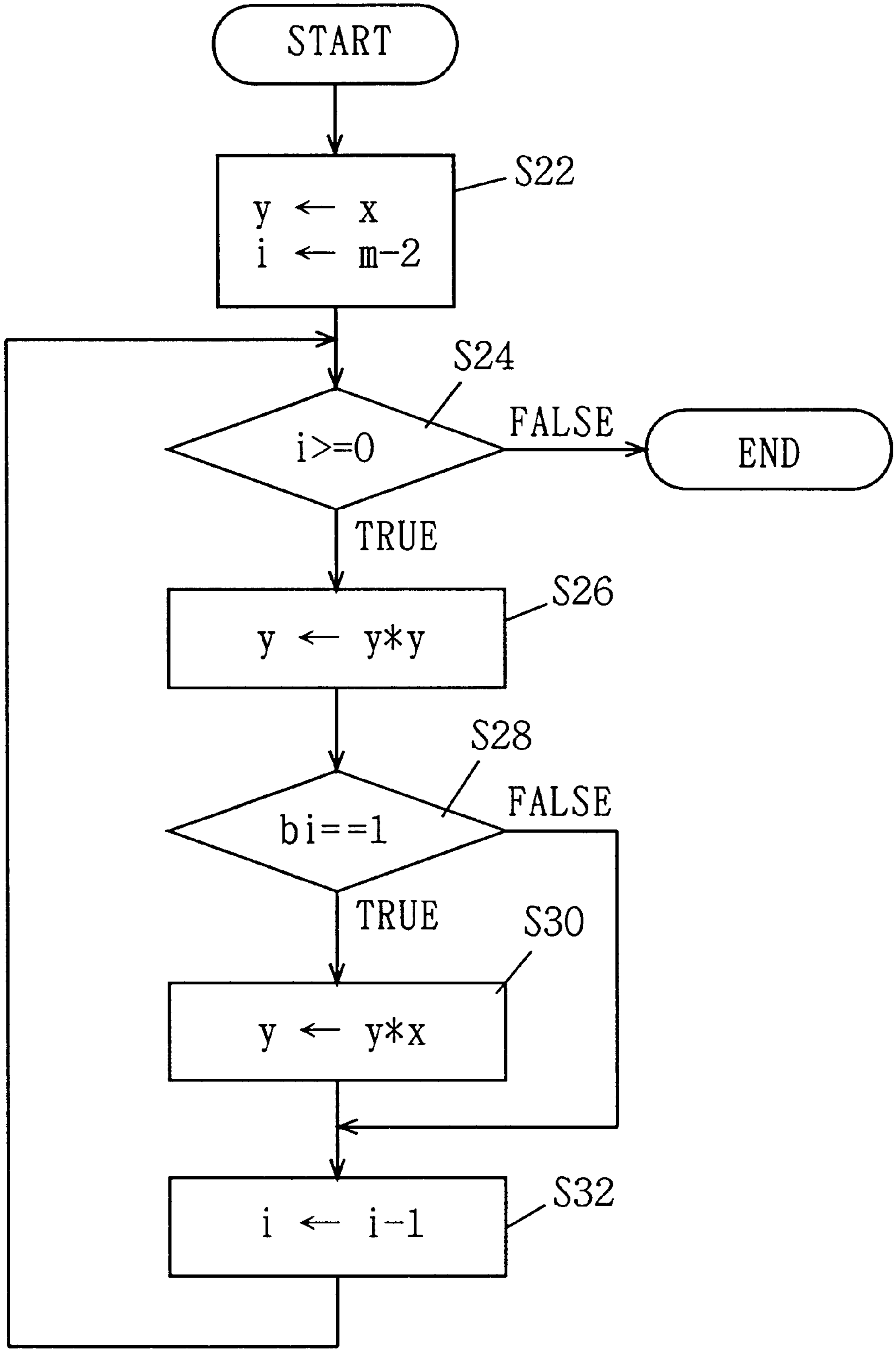
FIG. 1 is a flow chart showing a power calculation process of an integer exponent according to conventional art 1.
Figure 2:
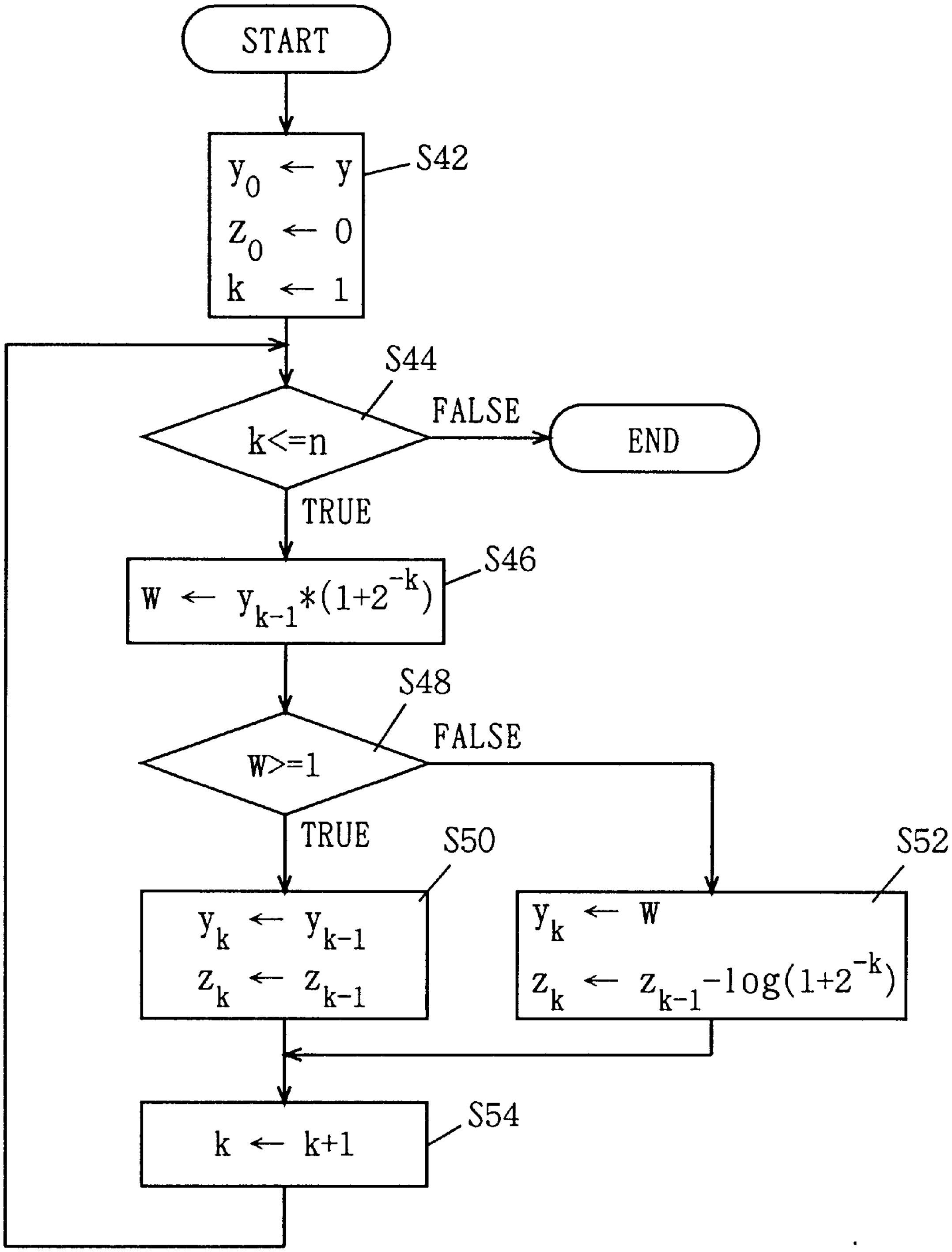
FIG. 2 is a flow chart showing a logarithmic function calculation process in a power calculation process of a real number exponent according to conventional art 2.
Figure 3:
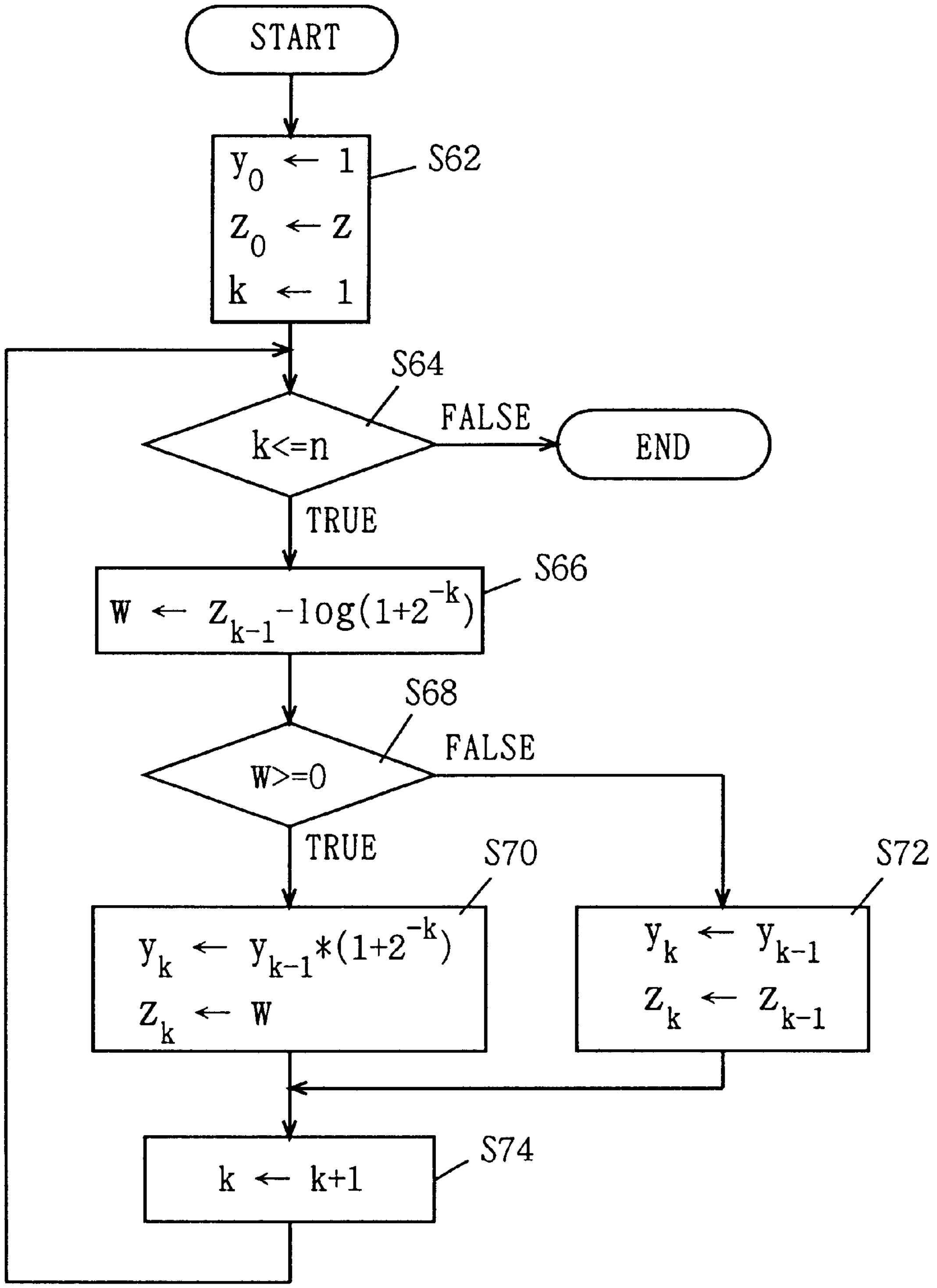
FIG. 3 is a flow chart showing an exponential function calculation process of a power calculation process of a real number exponent according to conventional art 2.

An execution processor 40 according to a first embodiment of the present invention will be described hereinafter with reference to FIGS. 4–8.

Referring to FIG. 4, execution processor 40 includes an instruction memory 48 for storing an instruction, a memory 52 and a register file 54 for storing data, a sequence controller 46 for providing overall control of processor 40 while reading out data from instruction memory 48, an address generation unit 50 for generating an address to read out data from memory 52 or register file 54, and an address to write data into memory 52 or register file 54 according an instruction from sequence controller 46, an input/output interface 44 for transferring data with the outside world, a bus 68 which is a passage for transferring data and instructions, and an execution unit 42 for carrying out various calculations.

Execution unit 42 includes an ALU (Arithmetic Logic Unit) 56 for carrying out logical operation, a MPYU (Multiplier Unit) 58 for carrying out multiplication, a SQRTU (Square Root Calculation Unit) 60 for carrying out square root calculation, a divider 62, and an execution unit controller 64 for providing control of various units.

Execution unit controller 64 includes a power calculation controller 66 receiving an instruction from sequence controller 46 for providing control to carry out power calculation of an integer exponent according to the content of an e register 78, and for transmitting an end flag indicating the end of a power calculation to sequence controller 46.

Register file 54 includes an x register 76 for storing base data, and an e register 78 for storing integer exponent data of N bits to carry out power calculation of an integer exponent.

Figure 5:
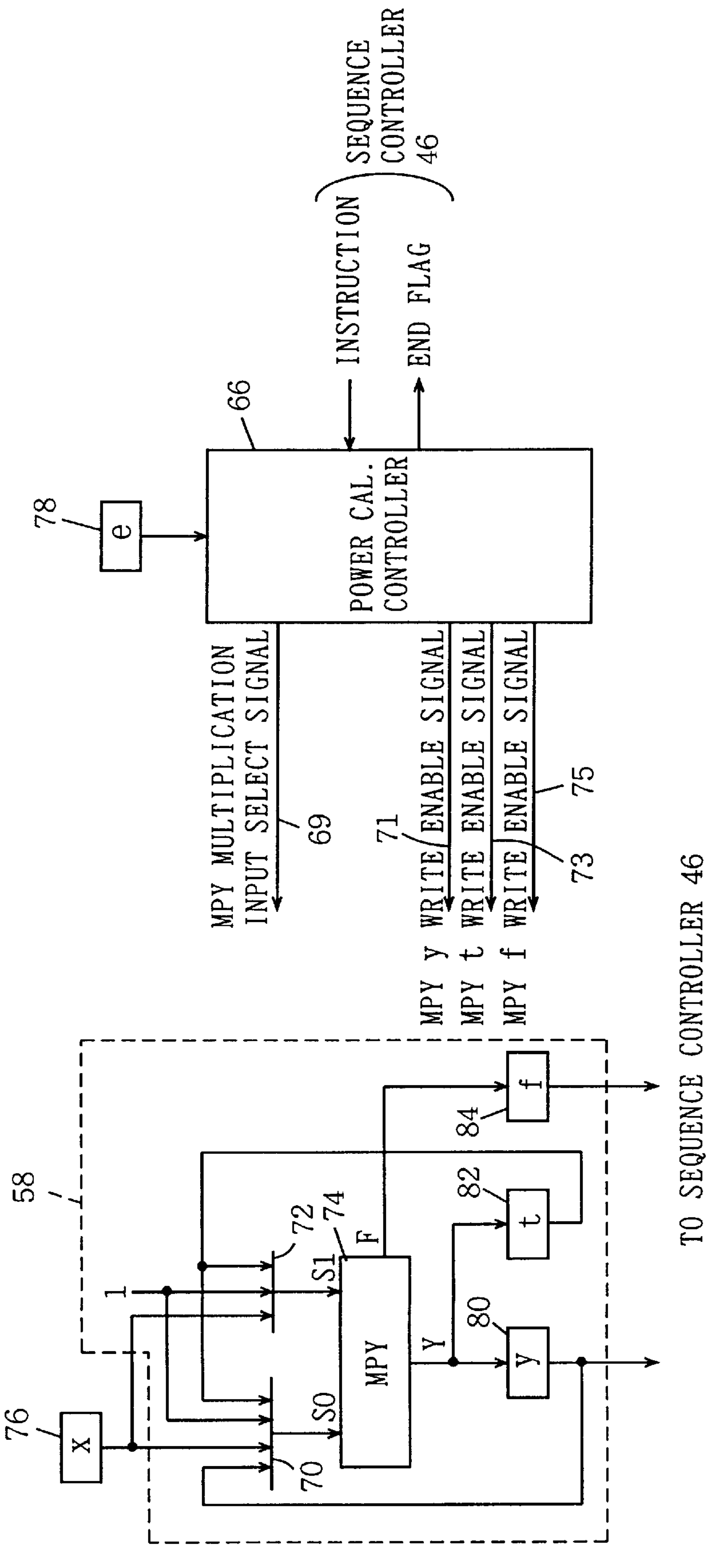
FIG. 5 is a block diagram of an execution unit 42 according to the first embodiment of the present invention.

Referring to FIG. 5, MPYU 58 includes a MPY (Multiplier) 74 for obtaining the product of two input data S0 and S1 and providing a result Y, a y register 80 for storing calculation result Y of MPY 74 according to a write enable signal 71 output from power calculation controller 66 connected to MPY 74, a t register 82 connected to MPY 74 for storing calculation result Y of MPY 74 according to a write enable signal 73 output from power calculation controller 66, an f register 84 connected to MPY 74 for storing an operation flag F of MPY 74 according to a write enable signal 75 output from power calculation controller 66, a first multiplication input selector 70 receiving outputs of y register 80, x register 76, a fixed value 1, and t register 82 for selecting one of the four received outputs according to a multiplication input select signal 69 output from power calculation controller 66 and providing the selected one to MPY 74 as input data S0, and a second multiplication input selector 72 receiving outputs of x register 76, a fixed value 1, and t register 82 for selecting one of the three outputs according to a multiplication input select signal 69 output from power calculation controller 66 and providing the selected one to MPY 74 as input data S1.

Operation flag F is formed of a plurality of bits. Operation flag F includes a zero flag that is set when the calculated result is 0, or an overflow flag that is set when the calculated result exceeds the data region of a representation range.

Figure 6:
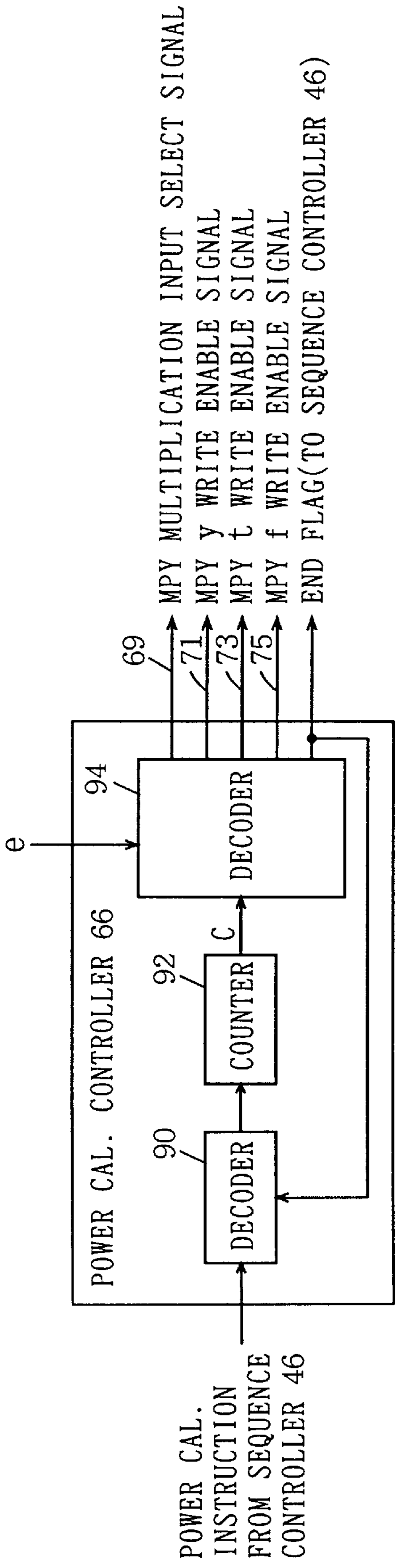
FIG. 6 is a block diagram of a power calculation controller 66 according to the first embodiment of the present invention.

Referring to FIG. 6, power calculation controller 66 includes a decoder 90, a counter 92, and a decoder 94. Decoder 90 receives a power calculation instruction from sequence controller 46 and an end flag from decoder 94 to provide control of counter 92. Counter 92 receives a signal from decoder 90 to set a count value C for a repetitive process. Decoder 94 receives count value C provided from counter 92 and an output of e register 78 for checking each bit in e register 78 while providing a multiplication input select signal 69 to select input data S0 and S1 of MPY 74. Decoder 94 also provides a write enable signal 71 for writing calculation result Y of MPY 74 to y register 80, a write enable signal 73 for writing calculation result Y of MPY 74 to t register 82, and a write enable signal 75 for writing operation flag F of MPY 74 to f register 84. The end flag indicating termination of the process is also transmitted to sequence controller 46 and decoder 90.

Referring to FIG. 7, decoder 94 includes a first multiplication input select signal generation unit 100 for generating a multiplication input select signal 69 to select input data S0 of MPY 74, a second multiplication input select signal generation unit 102 for generating a multiplication input select signal 69 to select input data S1 of MPY 74, a first write enable signal generation unit 104 for generating write enable signal 73, a second write signal generation unit 106 for generating write enable signals 71 and 75, and an end flag generation unit 108 for generating an end flag.

First multiplication input select signal generation unit 100 includes comparators 110 and 112 receiving count value C for determining whether C is 1 and 2, respectively, NOT gates 114, 116 and 118 receiving a value of an output signal line 124 of comparator 110, a value of an output signal line 126 of comparator 112, and count value C, respectively, an AND gate 120 having an input connected to output signal line 128 of NOT gate 114 and an input receiving and count value C, and an AND gate 122 having inputs connected to output signal lines 132 and 134 of NOT gates 116 and 118, respectively.

Second multiplication input select signal generation unit 102 includes a decoder 137 for providing a signal according to count value C, an exponent bit data selector 136 for providing a value of a specified bit in e register 78 according to a signal output from decoder 137, NOT gates 142, 148, 150 and 154 receiving values of output signal line 138 of exponent bit data selector 136, output signal line 124 of comparator 110, output signal line 126 of comparator 112, and count value C, respectively, AND gates 140, 152 and 163, and OR gates 146 and 156.

End flag generation unit 108 includes a an exponent OR data selector 168 for selecting and providing any one of an ORed value between predetermined bits of the value of e register 78, a fixed value 0, and a fixed value 1 according to a select signal from decoder 137, and a NOT gate 170 having an input connected to the output of exponent OR data selector 168.

First write enable generation unit 104 includes a NOT gate 178 for receiving count value C, and an AND gate 180 for receiving an signal from output signal line 182 of NOT gate 178 and second write enable signal generation unit 106.

Second write enable generation unit 106 includes a latch 172 for storing the output of exponent OR data selector 168, and an AND gate 176 for receiving an output of latch 172 and count value C. The output of latch 172 is provided to AND gate 180 of first write enable signal generation unit 104.

Each component operates as set forth in the following.

Decoder 137 provides a signal to select e<i> as an output of exponent bit data selector 136 when count value C is 2i+1 or 2i+2 (i is an integer of 0 and above). For example, when count value C is 3 (=2×1+1), decoder 137 provides a signal to select C<1>. When count value C is 2i+1 or 2i+2 (i is an integer of at least 0), decoder 137 provides a signal to select the OR of e<N−1:i+1> as the output of exponent OR data selector 168. Here, the OR of e<m:n> implies the logical sum from e<m> to e<n>. When count value C is 3, for example, decoder 137 provides a signal to select the OR of e<N−1:2>.

First multiplication input select signal generation unit 100 receives count value C to provide from signal lines 2A7, 2A8, 2A9 and **2A*a* a signal for selecting the value of t register 82, a signal for selecting the value of y register 80, a signal for selecting the value of x register 76, and a signal for selecting a fixed value 1, respectively, as S0. It is assumed that signal lines 2A7, 2A8, 2A9 and 2A*a*** are active when 1. When the value of a certain signal line is 1, the value of all the other signal lines is 0.

For example, when count value C is 1, the output of comparator 110 becomes TRUE, whereby the value of signal line 124 attains 1. In contrast, the output of comparator 112 becomes FALSE, so that the value of signal line 126 becomes 0. Since count value C takes an odd number, the zeroth bit C<0> of C becomes 1. Therefore, the value of signal line 130 is 1. Signal line 128 corresponds to a transmitted version (1) of signal line 124 through NOR gate 114, i.e. takes the value of 0. Signal line 132 corresponds to a transmitted version (0) of signal line 126 through NOR gate 116, i.e. takes a value of 1. Signal line 134 corresponds to a transmitted version (1) of signal line 130 through NOT gate 118, i.e. takes the value of 0. Therefore, signal line 2A7 corresponds to the transmitted version (1) of signal line 132 and (0) of signal line 134 through AND gate 122, i.e. takes the value of 0. Signal line 2A8 corresponds to the transmitted version of (1) of signal line 130 and (0) of signal line 128 through AND gate 120, i.e. takes the value of 0. Signal line 2A9 takes the value of signal line 126, i.e. 0. Signal line **2A*a* takes the value of signal line 124**, i.e. 1. It is therefore appreciated that only the signal selecting a fixed value 1 is rendered active.

When count value C is 2, comparator 112 is TRUE, and the value of signal line 126 results in 1. When count value C is an even number, C<0> becomes 0, and signal line 130 takes the value of 0. The values of signal lines 2A7, 2A8, 2A9 and **2A*a* over different values of count value C are shown in Table 1. It is appreciated from Table 1 that the values of 2A7, 2A8, 2A9 and 2A*a*** are exclusive.

TABLE 1

| Count Value C | 2A7 | 2A8 | 2A9 | 2Aa |
|---|---|---|---|---|
| 1 | 0 | 0 | 0 | 1 |
| 2 | 0 | 0 | 1 | 0 |
| 3 | 0 | 1 | 0 | 0 |
| 4 | 1 | 0 | 0 | 0 |
| 5 | 0 | 1 | 0 | 0 |

TABLE 1-continued

| Count Value C | 2A7 | 2A8 | 2A9 | 2Aa |
|---|---|---|---|---|
| 6 | 1 | 0 | 0 | 0 |
| 7 | 0 | 1 | 0 | 0 |
| 8 | 1 | 0 | 0 | 0 |
| 9 | 0 | 1 | 0 | 0 |
| 10 | 1 | 0 | 0 | 0 |
| 11 | 0 | 1 | 0 | 0 |
| 12 | 1 | 0 | 0 | 0 |
| 13 | 0 | 1 | 0 | 0 |
| 14 | 1 | 0 | Q | 0 |
| 15 | 0 | 1 | 0 | 0 |

Second multiplication input select signal generation unit 102 receives count value C and a value of e register 78 to output a signal for selecting a value of t register 82, a value of x register 76, and fixed value 1 as S1 from signal lines 2A4, 2A5 and 2A6, respectively. Signal lines 2A4, 2A5 and 2A6 are active when 1. When a certain signal line takes the value of 1, the value of all the other signal lines is 0.

For example, when count value C is 3, a signal for selecting the first bit value of e<1> of e register 78 is output from decoder 137. Therefore, signal line 138 takes the value of e<1>. When e<1> is 0, signal line 158 takes a value corresponding to a transmitted version (0) of signal line 138 through NOT gate 142, i.e. 1.

When count value C is 3, the values of signal lines 124 and 126 which are the outputs of comparators 110 and 112 respectively are 0 since count value C is neither 1 nor 2. Therefore, signal line 160 takes a value which corresponds to a transmitted version (0) of signal line 124 through NOT gate 148, i.e. 1, and signal line 162 takes a value which corresponds to a transmitted version (0) of signal line 126 through NOT gate 150, i.e. 1.

Since count value C=3 is an odd number, the zeroth bit value C<0> of C becomes 1. Therefore, signal line 130 takes a value of 1. Signal line 164 corresponds to a transmitted version (1) of signal line 130 through NOT gate 154, i.e. takes the value of 0.

Signal line 166 takes a value corresponding to the transmitted version of (0) of signal line 138 and (0) of signal line 164 through OR gate 156, i.e. 0. Signal line 164 takes a value corresponding to the transmitted version of (0) of signal line 124 and (0) of signal line 138 through AND gate 163, i.e. 0.

Signal line 2A4 takes a value corresponding to the transmitted version of (0) of signal line 166 and (1) of signal line 162, and (1) of signal line 160 through AND gate 152, i.e. 0. Signal line 2A5 takes a value corresponding to the transmitted version of (0) of signal line 126 and (0) of signal line 164 through OR gate 146, i.e. 0. Signal line 2A6 takes a value corresponding to the transmitted version of (1) of signal line 158 and (1) of signal line 130 through AND gate 140, i.e. 1. Therefore, it is appreciated that only the signal that selects a fixed value 1 is rendered active.

The operation of end flag generation unit 108 will be described hereinafter. The value of signal line 2A1, i.e. the value of the end flag, corresponds to a transmitted version of the output from exponent OR data selector 168 through NOT gate 170. Therefore, the end flag is set to 1 when the logical sum is 0. More specifically, the end flag is set to 1 and the process terminated when all the bits more significant then the currently processed bit are 0. For example, it is now assumed that the value of e register 78 is 00010110 in binary representation. When count value C is 7, the logical sum (1) of e<7:4> is output from exponent OR data selector 168. Therefore, the end flag is set to 0, indicating that the process has not ended. When count value C is 9, the logical sum (0) of e<7:5> is output from exponent OR data selector 168. As a result, the end flag is set to 1, indicating that the process has ended.

First write signal generation unit 104 operates as set forth in the following. Signal line 182 takes a value which is a transmitted value of C<0> through NOT gate 178. More specifically, signal line 182 indicates a value of 1 and 0 when count value C is an even number and an odd number, respectively. Signal line 2A3 takes a value that corresponds to the transmitted version of the value of latch 172 and the value of signal line 182 through AND gate 180. The output of exponent OR data selector 168 when the count value is C−1 is stored in latch 172. Therefore, the value of signal line 2A3 becomes 1 when count value C is an even number and the logical sum of e<N−1:i+1> is 1 for count value C−1 (=2i+1), whereby write enable signal 73 to write calculation result Y of MPY 74 into t register 82 is rendered active. For example, it is assumed that the value of e register 78 is 00010110 in binary representation. When count value C is 8, the logical sum (1) of e<N−1:4> which is the output of exponent OR data selector 168 for count value C=7 is held in latch 172. Also, signal line 182 takes a value of 1 since count value C is an even number.

The operation of second write enable signal generation unit 106 will be described hereinafter. Signal line 2A2 takes a value which is the transmitted version of the value stored in latch 172 and the value of C<0> through AND gate 176. Therefore, signal line 2A2 takes a value of 1 when count value C is an odd number and the logical sum of e<N−1:i+1> for count value C−1(=2×i) is 1, whereby write enable signal 71 to write calculation result Y of MPY 74 into y register 80 and write enable signal 75 to write operation flag F of MPY 74 into f register 84 are rendered active. It is now assumed that the value of e register 78 is 00010110 in binary representation, for example. When count value C is 7, the logical sum (1) of e<N−1:4> is held in latch 172. Also, signal line 2A2 takes the value of 1 since the count value C is an odd number.

The process flow of execution processor 40 will be described with reference to FIG. 8. In the present implementation, e register 78 includes 8 bits. Count value C output from counter 92 corresponds to the number of steps of the process. In an odd-numbered step, power calculation controller 66 sequentially checks whether each bit of e register 78 is 1 or not from the LSB to provide selection control of input data S0 and S1 of MPY 74. At the first step, a fixed value 1 is selected as S0. In subsequent odd-numbered steps, the value of y register 80 is selected as S0. As to S1, 1 is selected if the value (e<i>) of bit i to be checked in e register 78 is 0, and the value of t register 82 is selected if e<i> is 1. It is to be noted that the value of x register 76 is selected when e<0> is 1 for only the first step. Following selection of input data S0 and S1, multiplication is carried out by MPY 74. The calculation result is stored in y register 80. Simultaneously, the NOR of the bits more significant than the currently checked bit in e register 78 is taken to set the end flag when the NOR is 1 (all the bits are 0). Thus the operation ends.

In an even numbered step, input data S0 and S1 of MPY 74 select the same value. The value of x register 76 is selected only at the time of multiplication for the second step. In subsequent even-numbered steps, the value of t register 82 is selected. The selected value is squared to be stored in t register 82.

Writing operation flag F into f register 84 is carried out under control of power calculation controller 66 to hold the prior flag data in the multiplication of an even-numbered step and to write a flag in the multiplication of an odd-numbered step. For example, in an execution processor including a floating point data computation device, a flag is generated to be transmitted to the sequence controller of the execution processor when overflow or underflow occurs to induce interruption. The direct usage of the square calculation result of an even-numbered step in the power calculation depends on the value of each bit in the integer exponent data register. For example, even when overflow occurs in the square calculation, the power calculation result will not overflow if that calculated result is not used in the subsequent power calculation. There is a possibility that erroneous interruption will occur if the operation flag generated from the multiplier by an operation of an even-numbered step is exactly transmitted to the sequence controller. In the multiplication process of an odd-numbered step, the calculated result is a partial product of the power calculation result to be obtained. Therefore, a correct flag of the intermediate data of power calculation is generated. There is no disadvantage for the sequence controller to receive this flag. Furthermore, since the power calculation result will certainly overflow if overflow occurs during the process, a flag can be generated more quickly to the sequence controller.

Consider the case where the value of x register 76 is a and the value of e register 78 is 00000011 in binary representation, i.e. for seeking $a^3$. At the first step, e<0>=1. Therefore, 1 is selected as S0 and a is selected as S1. The calculation result a of S0 and S1 is stored in y register 80. The process does not end since the value of the end flag, i.e. the NOR of e<7:1>, is 0. At the second step, a is selected for S0 and S1 since the NOR of e<7:1> is 0. The square of a is calculated by MPY 74. The calculation result is stored in t register 82. At the third step, e<1>=1. Therefore, value a of y register 80 is selected for S0, and value $a^2$ of t register 82 is selected for S1. MPY 74 calculates the product of a and $a^2$. The calculated result $a^3$ is stored in y register 80. Here, all the values from e<2> to e<7> which is the MSB (most significant bit) are 0. Therefore, the value of y register 80 will not change even if multiplication is carried out thereafter. The power calculation is substantially completed at this step. Therefore, power calculation controller 66 terminates the operation here to avoid repetition of subsequent multiplication, and sets the end flag by the NOR from e<2> to e<7>.

According to execution processor 40 including the intermediate result data register, power calculation is effected by sequentially checking each bit of e register 78 from the LSB to select the input to MPY 74 while alternating the square calculation of the input data and the multiplication of storing the result to y register 80. Execution processor 40 also detects the end of power calculation by taking the NOR of the bits more significant than the bit used in input/output selection control to terminate repetition of multiplication and to generate an end flag. Thus, power calculation with an integer exponent can be carried out speedily with few additional circuits to MPY 74.

Furthermore, execution processor 40 provides the write control of operation flag F of MPY 74 to facilitate a correct report of operation flag F to sequence controller 46 and the like.

Second Embodiment

An execution processor 190 according to a second embodiment of the present invention will be described hereinafter with reference to FIGS. 9–11.

Execution processor 190 of the second embodiment corresponds to the execution processor of FIG. 4, and employs an execution unit 192 instead of execution unit 42, an execution unit controller 194 instead of execution unit controller 64, a power calculation controller 196 instead of power calculation controller 66, and a MPYU 198 instead of MPYU 58. The remaining elements are similar to those shown in FIG. 4, and description thereof will not be repeated.

Figure 9:
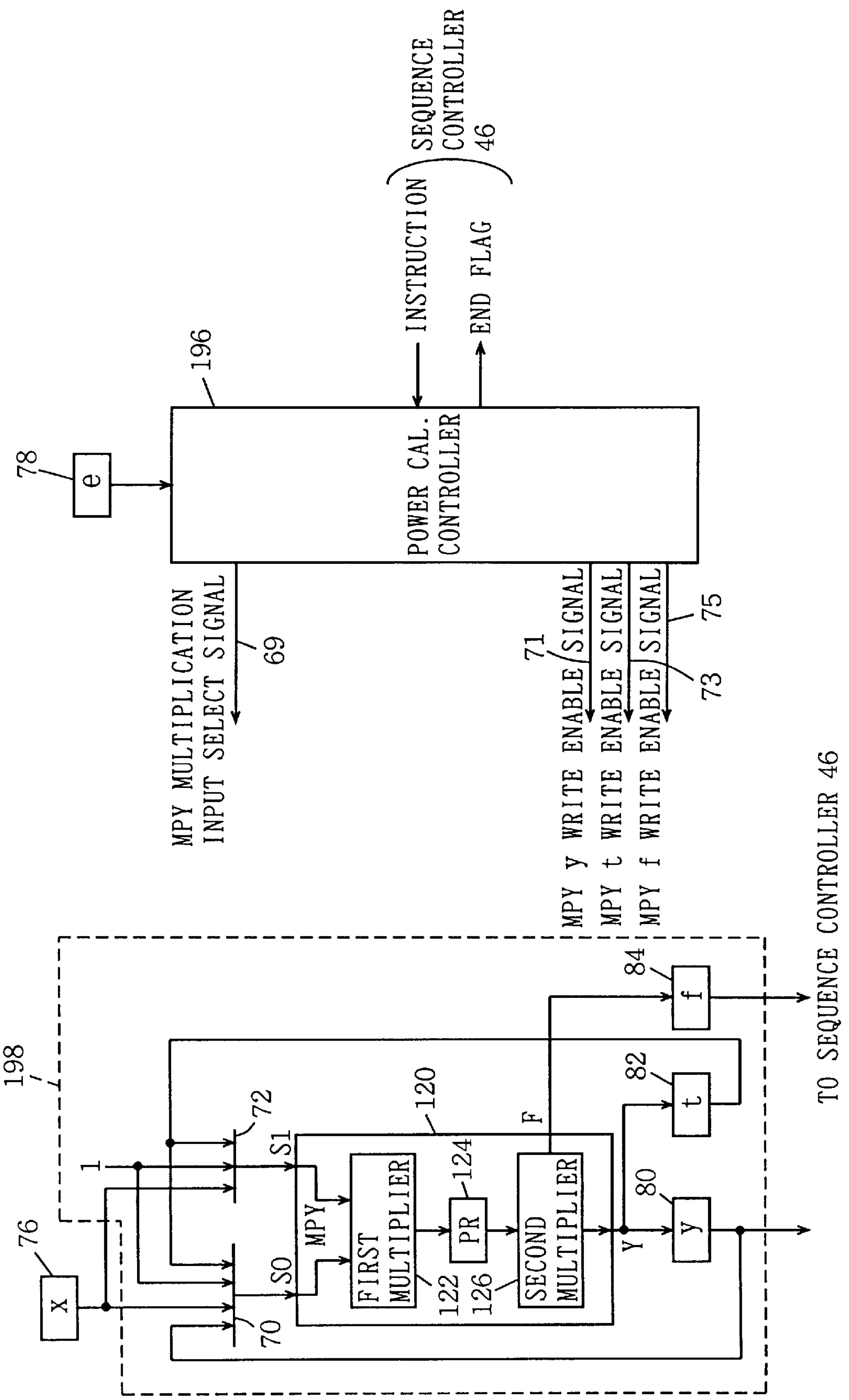
FIG. 9 is a block diagram of an execution unit 372 according to a second embodiment of the present invention.

Referring to FIG. 9, MPYU 198 includes a MPY 120 having the process divided into two stages to obtain the product of two input data S0 and S1 and output a result Y, a y register 80 connected to MPY 120 for storing a calculation result Y of MPY 120 according to a write enable signal 71 output from power calculation controller 196, a t register 82 connected to MPY 120 for storing calculation result Y of MPY 74 according to a write enable signal 73 output from power calculation controller 196, an f register 84 connected to MPY 120 for storing operation flag F of MPY 120 according to a write enable signal 75 output from power calculation controller 196, a first multiplication input selector 70 receiving outputs of y register 80, x register 76, a fixed value 1 and t register 82 for selecting one of the received outputs according to a multiplication input select signal 69 output from power calculation controller 196 to provide the same to MPY 120 as input data S0, and a second multiplication input selector 72 receiving outputs of x register 76, a fixed value 1, and t register 82 for selecting one of the three received outputs according to a multiplication input select signal 69 output from power execution controller 196 to provide the same to MPY 120 as input data S1.

MPY 120 includes a first multiplier 122 for carrying out the prior stage process of multiplication, a PR (pipeline register) 124 for maintaining a calculated result of first multiplier 122, and a second multiplier 126 receiving a value of PR 124 and carrying out a latter stage process.

Operation flag F is similar to that of the first embodiment. Description thereof will not be repeated.

Figure 10:
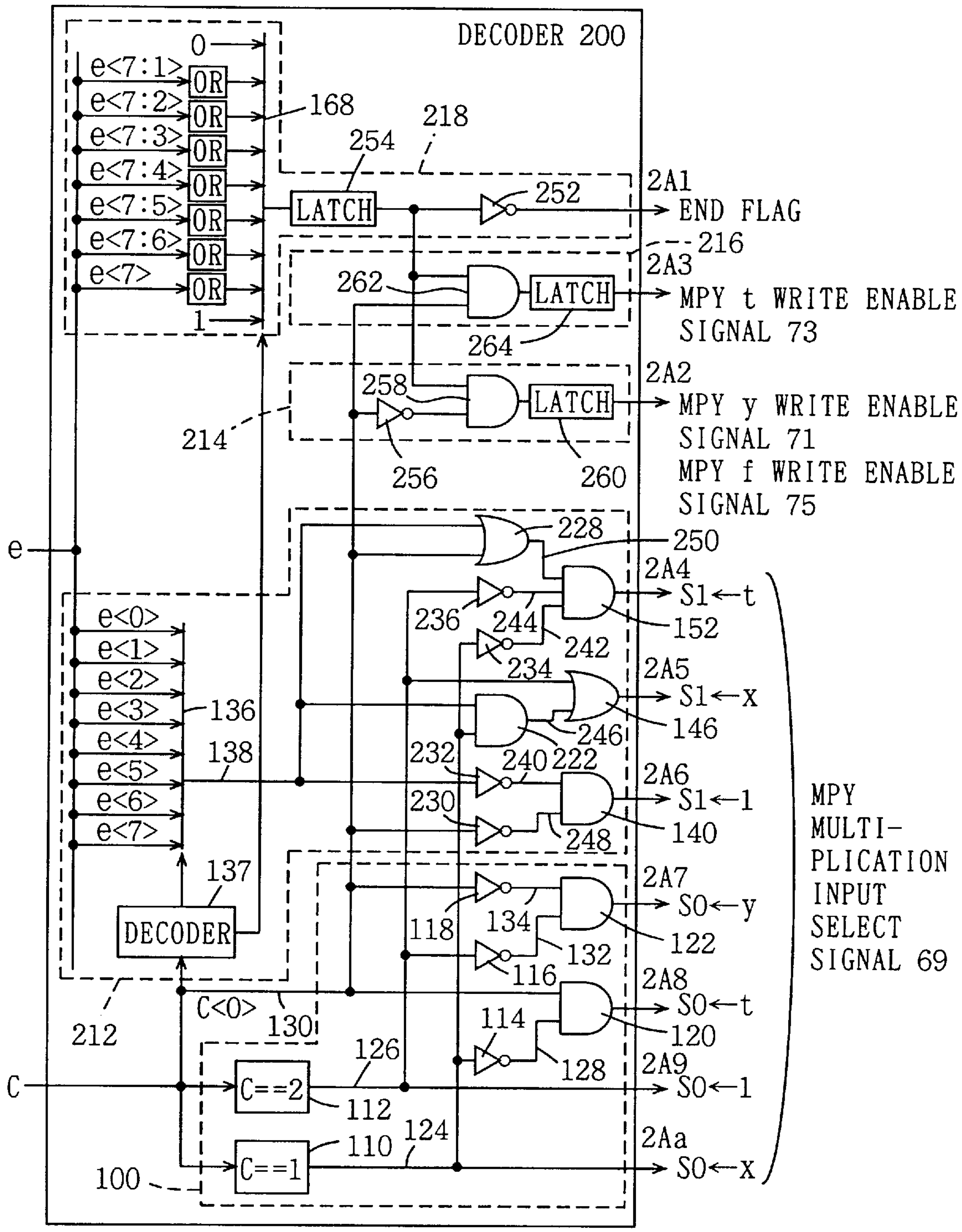
FIG. 10 is a logic circuit diagram of a decoder 200 according to the second embodiment of the present invention.
Figure 11:
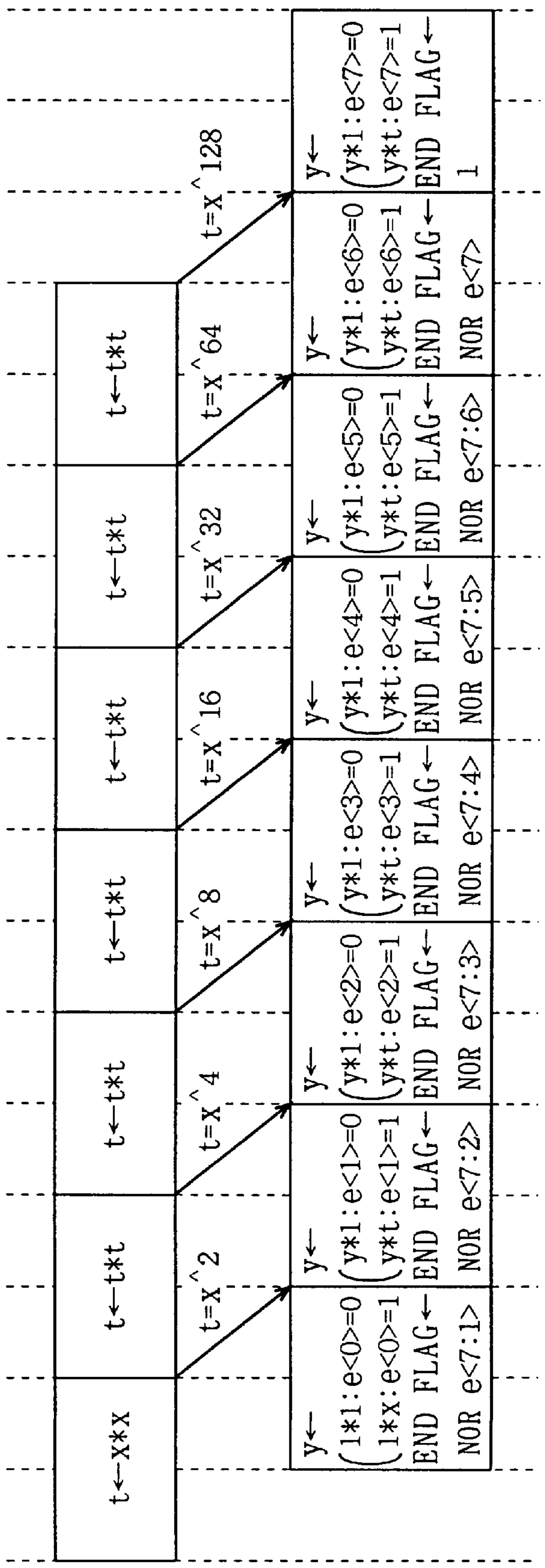
FIG. 11 is a flow chart showing a power calculation process according to the second embodiment of the present invention.

Power calculation controller 196 employs a decoder 200 shown in FIG. 10 instead of decoder 94 shown in FIG. 6.

Referring to FIG. 10, decoder 200 includes a first multiplication input select signal generator 100 for generating a multiplication input select signal 69 to select input data S0 of MPY 120, a second multiplication input select signal generation unit 212 for generating a multiplication input select signal 69 to select input data S1 of MPY 120, a first write enable signal generation unit 216 for generating a write enable signal 73, a second write enable signal generation unit 214 for generating write enable signals 71 and 75, and an end flag generation unit 218 for generating an end flag.

The structure of multiplication input select signal generation unit 100 is already described in the first embodiment. Description thereof will not be repeated here.

Second multiplication input select signal generation unit 212 includes a decoder 137 for providing a signal according to the value of count value C, an exponent bit data selector 136 for providing a value of a specified bit in e register 78 according to the signal output from decoder 137, AND gates 140, 222 and 152, OR gates 146 and 228, and NOT gates 230, 232, 234 and 236.

End flag generation unit 218 includes an exponent OR data selector 168 for selecting and providing any one of an ORed value between predetermined bits of the values of e register 78, a fixed value 0, and a fixed value 1 according to a select signal from decoder 137, a latch 254 for receiving and holding for a constant time the output of exponent OR data selector 168, and a NOT gate 252 for receiving and inverting the output of latch 254.

First write enable signal generation unit 216 includes an AND gate 262 and a latch 264.

Second write enable signal generation unit 214 includes a NOT gate 256, an AND gate 258, and a latch 260.

The operation of each component will be described hereinafter.

MPY 120 carries out the multiplication of two input data S0 and S1. Input data S0 is selected from any one of the value of y register 80, the value of t register 82, the value of x register 76, and fixed value 1 by multiplication input selector 70 according to multiplication input select signal 69 output from power calculation controller 196. Input data S1 is selected by multiplication input selector 72 from any one of the value of t register 82, the value of x register 76, and a fixed value 1 according to multiplication input select signal 69 output from power calculation controller 196. MPY 120 operates so that the latter half portion of a certain multiplication process is carried out by second multiplier 126 concurrently with the former half of an process of the next multiplication by first multiplier 122 to effect a pipeline process in which one multiplication is divided into two stages.

The operation of decoder 137 and first multiplication input select signal generation unit 100 are already described with reference to the first embodiment. Description thereof will not be repeated.

Second multiplication input select signal generation unit 212 receives count value C and the value of e register 78 to provide a signal to select the value of t register 82, to select the value of x register 76, and to select a fixed value 1 from signal lines 2A4, 2A5, and 2A6, respectively, as S1. Signal lines 2A4, 2A5 and 2A6 are rendered active when 1. When the value of a certain signal line is 1, all the values of the other signal lines are 0.

When count value C is, for example, 4, a signal to select the second bit value e<1> of e register 78 is input from decoder 137. Therefore, signal line 138 takes a value of e<1>. When e<1> is 0, signal line 240 takes a value corresponding to the transmitted version (0) of signal line 138 through NOT gates 232, i.e. 1.

Since count value C is neither 1 nor 2, the values of signal lines 124 and 126 which are the outputs of comparators 110 and 112, respectively, become 0. Signal line 242 takes a value corresponding to the transmitted version (0) of signal line 124 through NOT gate 234, i.e. 1, and signal line 244 takes a value corresponding to the transmitted version (0) of signal line 126 through NOT gate 236, i.e. 1.

Since count value C is an even number, the zeroth bit value of C, i.e. C<0>, becomes 0. As a result, signal line 130 takes a value of 0. Signal line 248 takes a value corresponding to the transmitted version (0) of signal line 130 through NOT gate 230, i.e. 1.

Signal line 246 takes a value corresponding to the transmitted version (0) of signal line 138 and (0) of signal line 126 through AND gate 222, i.e. 0. Signal line 250 takes a value corresponding to the transmitted version (0) of signal line 138 and (0) of signal line 130 through OR gate 228, i.e. 0.

Signal line 2A4 takes a value corresponding to the transmitted version (0) of signal line 250, (1) of signal line 244, and (1) of signal line 242 through AND gate 152, i.e. 0. Signal line 2A5 takes a value corresponding to the transmitted version of (0) of signal line 124 and (0) of signal line 246 through OR gate 146, i.e. 0. Signal line 2A6 takes a value corresponding to the transmitted version of (1) of signal line 240 and (1) of signal line 248 through AND gate 140, i.e. 1. Therefore, it is appreciated that only the signal selecting fixed value 1 is rendered active.

The operation of end flag generation unit 218 will be described hereinafter. The value of signal line 2A1, i.e. the value of the end flag, is the transmitted version of the value stored in latch 254 through NOT gate 252. At the time of count value C, the value output from exponent OR data selector 168 for count value C−1 is held in latch 254. It is assumed that the value of e register 78 is, for example, 00010110 in binary representation. When count value C is 8, the logical sum of e<7:4> output from exponent OR data selector 168 when count value C is 7, i.e. 1, is held. Therefore, the end flag is set to 0, indicating that the process has not ended. When count value C is 10, the logical sum of e<7:5>, i.e. 0 is held in latch 254. Therefore, the end flag is set to 1 to indicate that the process has ended.

The operation of first write enable signal generation unit 216 will be described hereinafter. A value corresponding to the transmitted version of the value of latch 254 and the value of signal line 130 through AND gate 262 is held for a constant time in latch 264. Therefore, at the time of count value C, signal line 2A3 takes the value of 1 when count value C−1 is an odd number and the value output from exponent OR data selector 168 for count value C−2 is 1. It is assumed that the value of e register 78 is, for example, 00010110 in binary representation. When count value C is 10, signal line 2A3 takes a value corresponding to the transmitted version of value (1) of signal line 130 for count value C=9 and the logical sum (1) of e<7:4> from exponent OR data selector 168, i.e. 1. Therefore, write signal 73 becomes 1 to enable writing for t register 82. When count value c is 12, signal line 2A3 takes a value corresponding to the transmitted version of value (1) of signal line 130 for count value C=11, i.e. 0 and the logical sum (0) of e<7:5> output from exponent OR data selector 168. Therefore, write enable signal 73 becomes 0 to inhibit writing for t register 82.

The operation of second write enable signal generation unit 214 will be described hereinafter. A value corresponding to the transmitted version of the value of latch 254 and the output of NOT gate 256 from signal line 130 through AND gate 258 is maintained for a constant time in latch 260. Therefore, at the time of count value C, signal line 2A2 takes the value of 1 when count value C−1 is an even number and the value output from exponent OR data selector 168 is 1 for count value C−2. It is assumed that the value of e register 78 is, for example, 00010110 in binary representation. When count value C is 9, signal line 2A2 takes an output value of AND gate 258 receiving value (1) which is the transmitted version of (0) of signal line 130 through NOT gate 256 for count value C=8 and the logical sum (1) of e<7:4> from exponent OR data selector 168, i.e. 1. Therefore, write enable signals 71 and 75 become 1 to allow writing of y register 80 and f register 84. When count value C is 11, signal line 2A2 becomes 0 which is the output value of AND gate 258 receiving value (1) which is the transmitted version (0) of signal line 130 through NOT gate 256 for count value C=10 and the logical sum (0) of e<7:5> output from exponent OR data selector 168. Therefore, write signals 71 and 75 become 0 to disable writing of y register 80 and f register 84.

The process flow of execution processor 190 will be described with reference to FIG. 11. In the implementation, e register 78 takes a 8-bit value. Counter value C output from counter 92 corresponds to the number of steps in the process. Power calculation controller 196 provides input/output selection control so that the value of t register 82 is squared by MPY 120 as an odd-numbered step to write the result into t register 82. It is to be noted that the value of x register 76 is squared only in the case of the first step, which is written into t register 82.

At the second step, a fixed value 1 is selected for S0, and the value of y register 80 is selected for S0 in subsequent even-numbered steps. As to S1, each bit of e is sequentially checked whether the value is 1 or not from the LSB to select 1 and the value of t register 82 for S1 when the bit value is 0 and 1, respectively. It is to be noted that at the second step, the value of x register 76 is selected if e<0> is 1. Multiplication of S0 and S1 is effected. Then, the result is written into y register 80.

Consider the case where the value of x register 76 is a and the value of e register 78 is 00000101 in binary representation, i.e. for seeking $a^5$. At the first step, execution processor 190 squares the value of x register 76, i.e. calculates $a^2$ to write the result into t register 82. At the second step, fixed value 1 is selected as S0. Value a of x register 76 is selected as S1 since e<0> is 1. The product of S0 and S1 is calculated. The result, i.e. a, is written into y register 80. The process is not yet terminated since the value of the end flag, i.e. the NOR of e<7:1>, is 0. At the third step, the value of t register 82, $a^2$, is squared. The calculated result, i.e. $a^4$, is written into t register 82. At the fourth step, the value of y register, i.e. a, is selected as S0. Fixed value 1 is selected as S1 since e<1> is 0. The product of S0 and S1 is calculated. The calculated result, i.e. a, is written into y register 80. The process is not yet terminated since the value of the end flag, i.e. the NOR of e<7:2>, is 0. At the fifth step, the value of t register 82, i.e. $a^4$, is squared. The calculated result $a^8$ is written into t register 82. At the sixth step, the value of y register 80, i.e. a, is selected for S0, and the value of t register 82, i.e. $a^4$, is selected for S1 since e<2> is 1.

The reason why the value of t register 82 is not the result of the fifth step ($a^8$) is set forth in the following. An odd-numbered step and an even-numbered step are processed concurrently. At the initiation of the sixth step, the process of the fifth step has not yet ended. Therefore, the result of the third step, i.e. $a^4$, is stored in t register 82. Then, the product of S0 and S1 is calculated, and the result ($a^5$) is written into y register 80. The process is ended since the value of the end flag, i.e. the NOR of e<7:3>, is 1 to set the end flag.

The multiplication of each step is divided into two stages of process. When the former half of a multiplication process in an odd number order is processed by first multiplier 122, the latter half of a multiplication process in an even number order is concurrently processed by second multiplier 126. Conversely, when the latter half of a multiplication process in an odd number order is processed by second multiplier 126, the former half of a multiplication process in an even number order is processed by first multiplier 122. When the operation time for a multiplication process implemented without being pipelined is T and the operation time of a longer stage for a multiplication process divided into two stages is T', T'<T. In the present embodiment, a multiplication result can be obtained for every time T'. Therefore, the operation efficiency of MPY 120 is improved to achieve a desired power calculation at high speed.

According to execution processor 190 using a MPY 120 of a 2-stage pipeline structure and including y and t registers 80 and 82 for holding intermediate results, power calculation is effected by alternating the square calculation of the value of x register 76 and the multiplication calculation to store the result into y register 80 while sequentially checking each bit value of e register 78 from the LSB for input selection of MPU 120. Thus, power calculation with an integer exponent can be carried out at high speed with few additional circuits to MPY 120.

Third Embodiment

An execution processor 270 according to a third embodiment of the present invention will be described hereinafter with reference to FIGS. 12–16.

Figure 12:
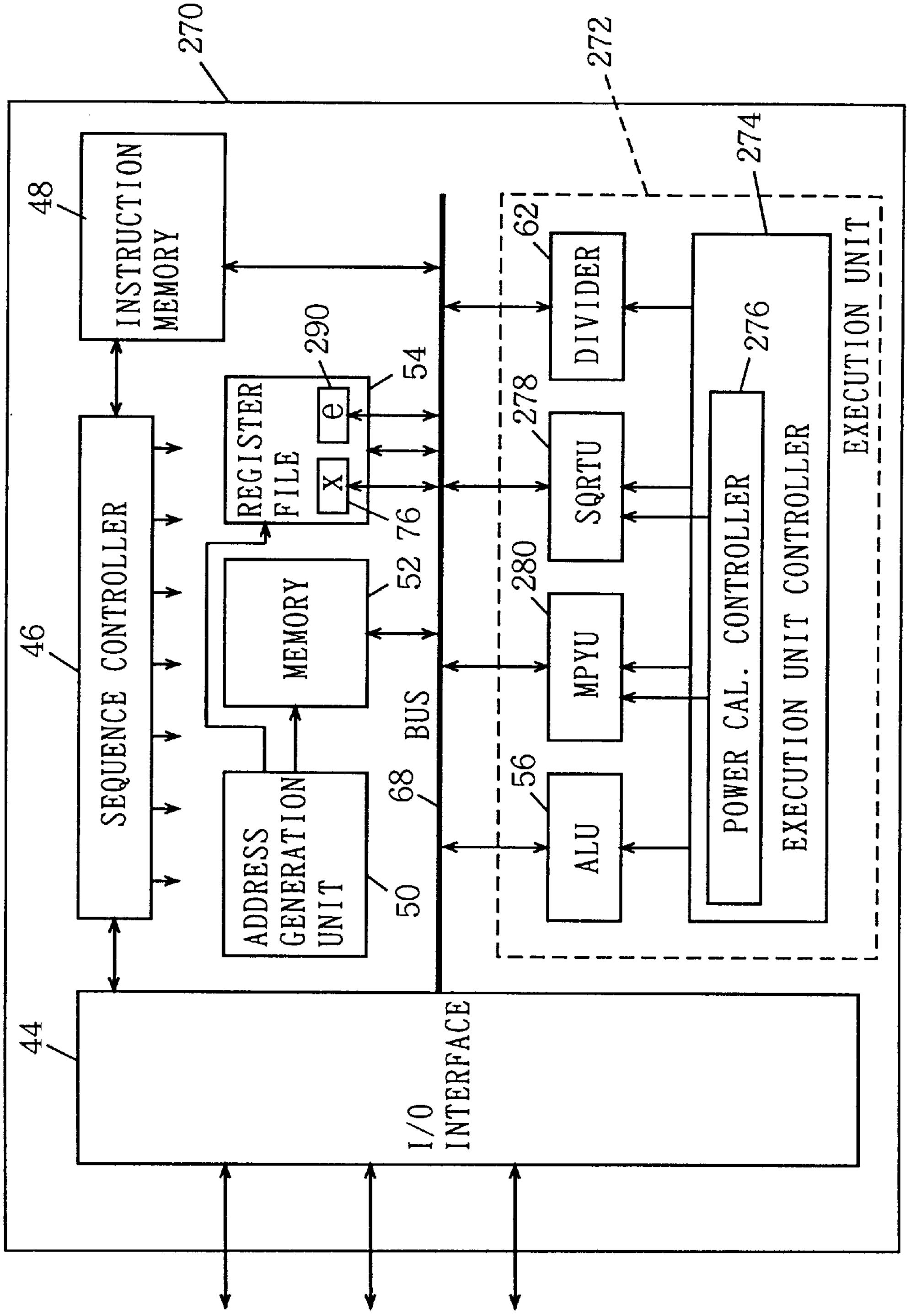
FIG. 12 is a block diagram showing an execution processor 270 according to a third embodiment of the present invention.

Referring to FIG. 12, execution processor 270 includes an instruction memory 48 for storing an instruction, a memory 52 and a register file 54 for storing data, a sequence controller 46 for providing overall control of processor 270 while reading out data from instruction memory 48, an address generation unit 50 for generating an address to read out data from memory 52 or register file 54 and an address to write data into memory 52 or register file 54 according to an instruction by sequence controller 46, an input/output interface 44 for transferring data with the outside world, a bus 68 which is the passage for transmitting data and instructions, and an execution unit 272 for carrying out various operations.

Execution unit 272 includes an ALU 56 to carry out logic operation, a MPYU 280 to carry out multiplication, a SQRTU 278 to carry out square root calculation, a divider 62 for carrying out division, and an execution unit controller 247 for providing control of various units.

Execution unit controller 274 includes a power calculation controller 276 to provide control for carrying out power calculation of a decimal exponent, and for transmitting an end flag indicating the end of a power calculation to sequence controller 46.

Register file 54 includes an x register 76 for storing base data, and an e register 290 for storing decimal exponent data of N bits.

Figure 13:
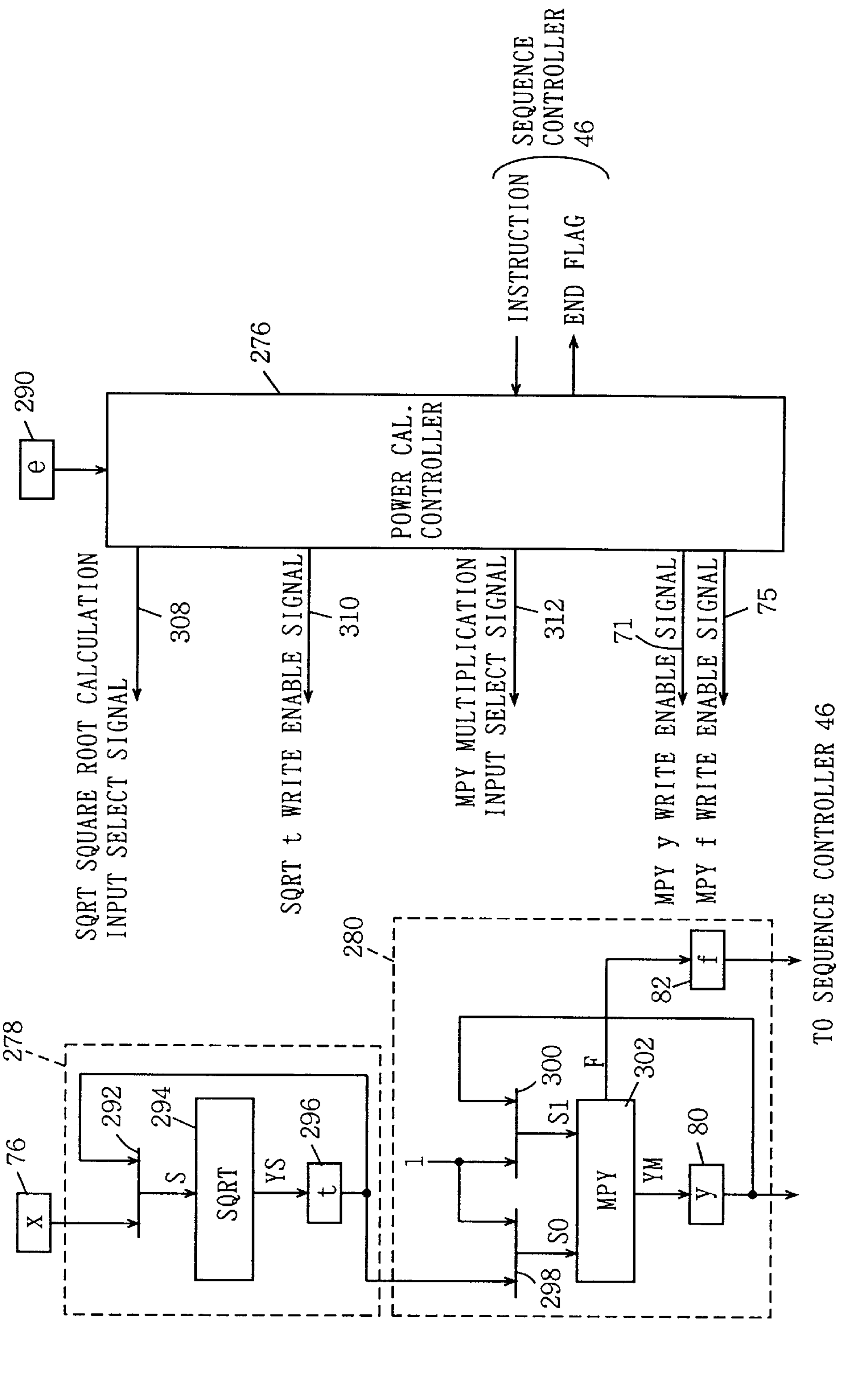
FIG. 13 is a block diagram showing an execution unit 272 according to the third embodiment of the present invention.

Referring to FIG. 13, SQRTU 278 includes a SQRT (square root calculation unit) 294 for obtaining a square root of input data S and providing a result YS, a t register 296 connected to SQRT 294 for storing calculation result YS of SQRT 296 according to a write enable signal 310 output from power calculation controller 276, and a square root calculation input selector 292 receiving outputs of x register 76 and t register 296 for selecting one of the two outputs according to a square root calculation input select signal 308 output from power calculation controller 276 to provide the same to SQRT 294 as input data S.

MPYU 280 includes a MPY 302 for obtaining the product of two input data S0 and S1 to output a calculation result YM, a y register 80 connected to MPY 302 for storing calculation result YM of MPY 302 according to write enable signal 71 output from power calculation controller 276, an f register 82 connected to MPY 302 for storing operation flag F of MPY 302 according to a write enable signal 75 output from power calculation controller 276, a first multiplication input selector 298 receiving outputs of t register 296 and fixed value 1 for selecting one of these two outputs according to multiplication input select signal 312 output from power calculation controller 276 and providing the same to MPY 302 as input data S0, and a second multiplication input selector 300 receiving outputs of a fixed value 1 and y register 80 for selecting one of the two outputs according to a multiplication input select signal 300 output from power calculation controller 276 and providing the same to MPY 302 as input data S1.

Operation flag F is similar to that described in the first embodiment. Description thereof will not be repeated.

Figure 14:
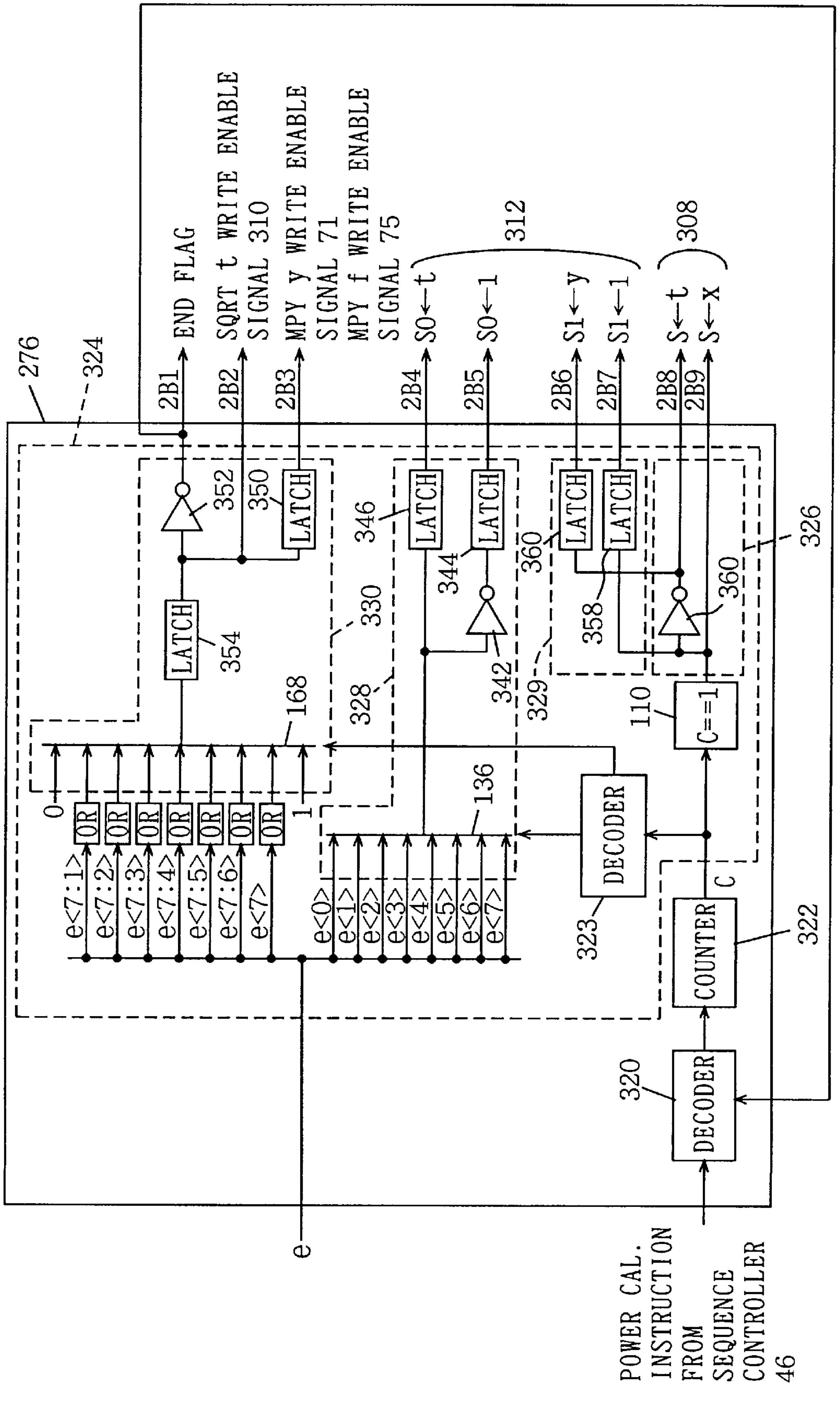
FIG. 14 is a logic circuit diagram of a power calculation controller 276 according to the third embodiment of the present invention.

Referring to FIG. 14, power calculation controller 276 includes a decoder 320, a counter 322, and a decoder 324.

Decoder 320 receives a power calculation instruction from sequence controller 46 and an end flag from decoder 324 to provide control of counter 322. Counter 322 receives a signal from decoder 320 to set count value C. Decoder 324 receives count value C output from counter 322 and the value of e register 290 to output a square root calculation input select signal 308 to select input data S of SQRT 294 and a multiplication input select signal 312 to select input data S0 and S1 of MPY 302 while checking each bit of e register 290. Decoder 324 also provides a write signal 310 to write calculation result YS of SQRT 294 to t register 296, a write enable signal 71 to write calculation result YM of MPY 302 to y register 80, and a write enable signal 75 to write operation flag F of MPY 302 to f register 82. Also, an end flag indicating the end of the process is transmitted to sequence controller 46 and decoder 320 respectively.

Decoder 324 includes a square root calculation input select signal generation unit 326 for generating a square root calculation input select signal 308 to select input data S of SQRT 294, a first multiplication input select signal generation unit 328 for generating a multiplication input select signal 312 to select input data S0 of MPY 302, a second multiplication input select signal generation unit 329 for generating a multiplication input select signal 312 to select input data S1 of MPY 302, a signal generation unit 330 for generating a write enable signal 310, a write enable signal 71, a write enable signal 75, and an end flag, a comparator 110 receiving output C of counter 322 to determine whether the value of C is 1 or not, and a decoder 323.

Square root calculation input select signal generation unit 326 includes a NOT gate 360 receiving an output of comparator 110.

First multiplication input select signal generation unit 328 includes an exponent bit data selector 136 for providing a value of a predetermined bit of e register 290 according to the signal output from decoder 323, an NOT gate 342 receiving an output of exponent bit data selector 136, and latches 344 and 346 receiving outputs of NOT gate 342 and exponential bit selector 136, respectively.

Second multiplication input select signal generation unit 329 includes latches 358 and 360 receiving outputs of comparator 110 and NOT gate 360, respectively.

Signal generation unit 330 includes an exponent OR data selector 168 for selecting and providing any one of an ORed value of predetermined bits of the value of e register 290, a fixed value 0, and a fixed value 1 according to a select signal from decoder 323, a latch 354 receiving and holding for a constant time the output of exponent OR data selector 168, an NOT gate 352 for receiving and inverting the output of latch 354, and a latch 350 for receiving and holding for a constant time the output of latch 354.

The operation of each component will be described hereinafter.

Decoder 323 provides a signal to select e<i−1> as the output of exponent bit selector 136 when count value C is i (i is a natural number). When count value C is 3, for example, decoder 323 provides a signal to select C<2>. When count value C is i, decoder 323 provides a signal to select the logical sum of e<N−1:i> as the output of exponent OR data selector 168. When count value C is 3, for example, decoder 323 provides a signal to select the logical sum of e<N−1:3>.

Square root calculation input select signal generation unit 326 provides a signal to select the value of x register 76 and t register 296 from signal lines SB9 and SB8, respectively, as S according to whether count value C is 1 or not. Square root calculation input select signal 308 is formed of the values of signal lines SB9 and SB8. Respective signal lines are rendered active when 1. When one signal line is 1, the other signal line takes the value of 0. When count value C is 1, signal line 2B9 takes a value of 1 and signal line 2B8 takes a value of 0. When count value C is a value other than 1, signal line 2B9 and 2B8 are 0 and 1, respectively.

First multiplication input select signal generation unit 328 receives a value output from exponent bit data selector 136 according to a signal output from decoder 323 to provide a signal to select the value of t register 296 and to select fixed value 1 as S0 from signal lines 2B4 and 2B5, respectively. Both signal lines are rendered active when 1. When the value of one signal line is 1, the value of the other signal line is 0. When the count value is C, signal line 2B4 takes the value output from exponent bit data selector 136 for count value= C−1, and signal line 2B5 takes a value corresponding to a transmitted version of the output value of exponent bit data selector 136 for count value=C−1 through NOT gate 342. When count value C is 3, for example, signal line 2B4 takes the value e<1> output from exponent bit data selector 136 for count value C=2, and signal line 2B5 becomes the NOT value of e<1>.

Second multiplication input select signal generation unit 329 receives count value C to provide a signal to select the value of y register 80 and to select a fixed value 1 as S1 from signal lines 2B6 and 2B7, respectively. Both signal lines are rendered active when 1. When the value of one signal line is 1, the other signal line takes the value of 0. When the count value is C, signal line SB6 takes a value corresponding to the transmitted version of the output of comparator 110 through NOT gate 360 for count value C−1, and signal line SB7 takes the output of comparator 110 for count value C−1. More specifically, when count value C is 2, signal lines 2B6 and 2B7 take the values of 0 and 1, respectively. When count value C takes a value other than 2, signal lines 2B6 and 2B7 become 1 and 0, respectively.

Signal generation unit 330 receives the output from exponent OR data selector 168 to output an end flag from signal line 2B1, a write enable signal 310 from signal line 2B2, and write enable signals 71 and 75 from signal line 2B3. When the count value is C, signal line 2B1 takes a value corresponding to the transmitted version of the output of exponent OR data selector 168 through NOT gate 352 for count value=C−1, signal line 2B2 takes the value output from exponent OR data selector 168 for count value C−1, and signal line 2B3 takes a value output from exponent OR data selector 168 for count value C−2. When count value C is 5, for example, signal line 2B1 takes the value output from exponent OR data selector 168 for count value C=4, i.e. the logical sum of e<7:3>.

The power calculation of a decimal exponent will be described with reference to FIG. 15. It is assumed that, in power calculation, exponent data e is a decimal of N (=n+1) digits, smaller than 1, and the MSB of the binary representation is down to the first place of decimal. In binary number representation and decimal number representation, e is expressed as the following formula (1). The eth power of x can be developed using the (½)th power of base x, i.e. a square root, as in the following formula (2).

$$e = b_0 b_1 \ldots b_i \ldots b_n \text{ (binary)} \qquad b_i = 0 \text{ or } 1 \tag{1}$$
$$= \left(\frac{1}{2}\right)^{b_0} + \left(\frac{1}{2}\right)^{2b_1} + \ldots + \left(\frac{1}{2}\right)^{(i+1)b_i} + \ldots + \left(\frac{1}{2}\right)^{(n+1)b_n} \text{ (decimal)}$$

$$X^e = X^{\left(\frac{1}{2}\right)^{b_0} + \left(\frac{1}{2}\right)^{2b_1} + \ldots + \left(\frac{1}{2}\right)^{(i+1)^{bi}} + \ldots + \left(\frac{1}{2}\right)^{(n+1)b_n}} \tag{2}$$
$$= X^{\left(\frac{1}{2}\right)^{b_0}} x X^{\left(\frac{1}{2}\right)^{2b_1}} x \ldots x X^{\left(\frac{1}{2}\right)^{(i+1)b_i}} x \ldots x X^{\left(\frac{1}{2}\right)^{(n+1)b_n}}$$

Figure 15:
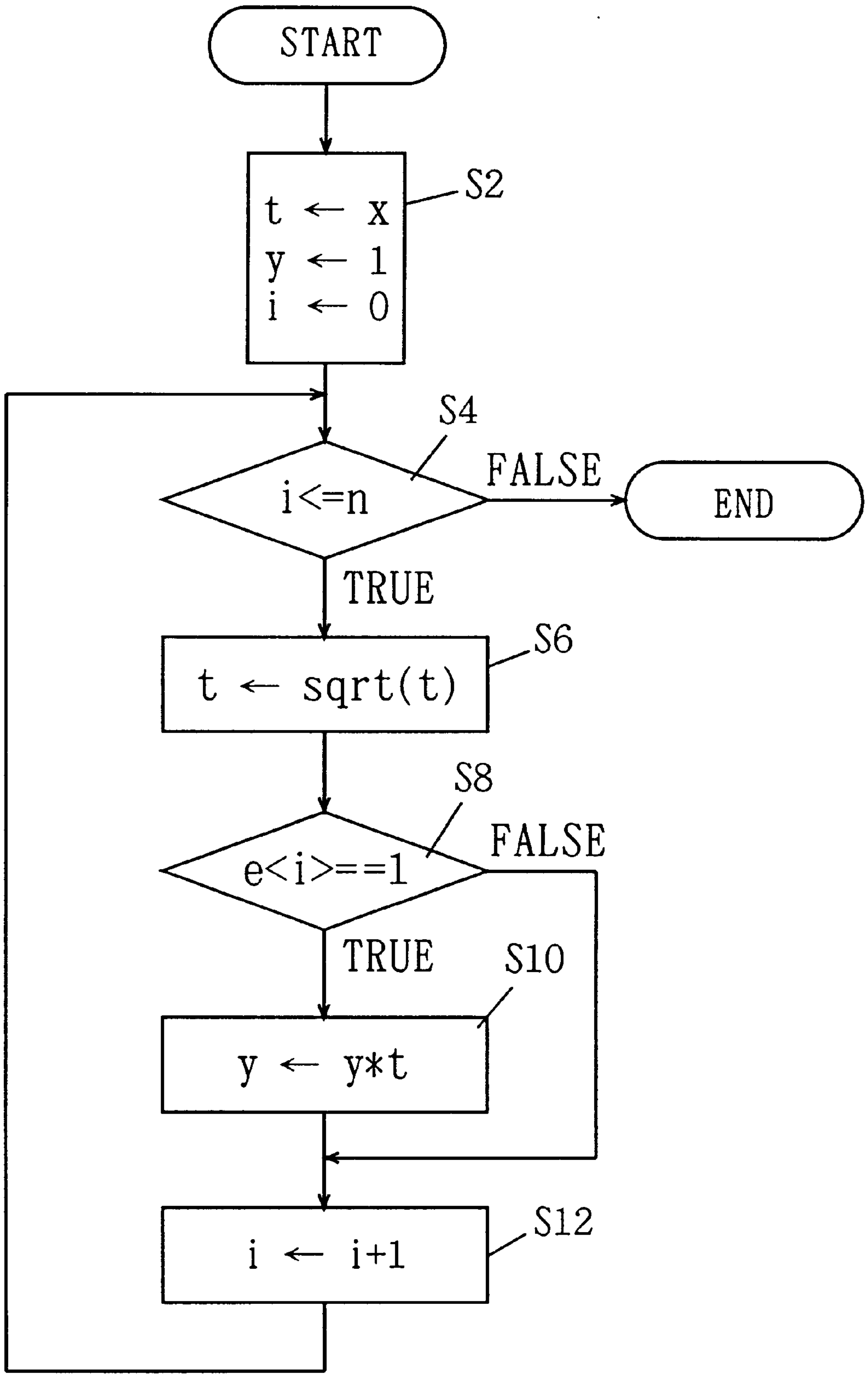
FIGS. 15 and 16 are flow charts of a power calculation process according to the third embodiment of the present invention.

According to the operation flow, the square root is repetitively calculated as the flow of FIG. 15 (S6). Control is provided of whether to multiply it by the output variable (S10) by determining the bit of the exponent data (S8). By repeating this by the number of times of the digits (n times) in the binary number representation of decimal exponent data e (S4, S12), the power calculation result is obtained.

The computation flow when e has 4 digits (n=4) in binary representation, and $$e = e\langle 0\rangle e\langle 1\rangle e\langle 2\rangle e\langle 3\rangle \text{ (binary)}$$
$$= 1001 \text{ (binary)}$$
$$= 0.5625 \text{ (decimal)}$$

i.e. calculation of $x^{0.5625}$, will be described hereinafter.

First, variables t, y, and i are prepared with t=x, y=1, i=0 as initial values (S2). Here, t is a temporary variable, y is a variable obtaining the final result, and i is the loop counter and the digit place pointer of the exponent data. The exponent has e<0> as the first decimal place.

In the first loop, i is equal to or less than n (=4) (TRUE at S4). Therefore, the square root of x ($x^{0.5}$) is obtained and provided to t (S6). Then, the first decimal place of e is detected to be 1 (TRUE at S8). Therefore,'t and y (=1) are multiplied. The result of $x^{0.5}$ is applied to y (S10). The counter is incremented by one, and control proceeds to the next loop (S12).

At the second loop, the square root of variable t($x^{0.5}$) is obtained ($x^{0.25}$), and provided to t (S6). The second decimal place e<1> is detected to be 0 (FALSE at S8). Therefore, the counter is incremented by 1, and control proceeds to the next loop (S12).

The third loop is analogous to the second loop. More specifically, the square root of variable t($x^{0.25}$) is obtained ($x^{0.125}$) and provided to t (S6). Since the third decimal place e<2>=0 (FALSE at S8), the counter is incremented by 1, and control proceeds to the next loop (S12).

At the fourth loop, the square root of variable t($x^{0.125}$) is obtained ($x^{0.0625}$), and provided to t (S6). The fourth decimal place e<3> is detected to be 1 (TRUE at S8). Therefore, t is multiplied by y (=$x^{0.5}$). The result $x^{0.5625}$ is provided to y (S10). The counter is incremented by 1 (S12). Since the counter satisfies the end condition (FALSE at S4), the process is terminated.

The process flow of execution processor 270 will be described hereinafter with reference to FIG. 16. In execution processor 270, e register 290 storing a decimal exponent is formed of 8 bits, i.e.

e=e<0>e<1> . . . e<7>

Count value C output from counter 322 corresponds to the number of steps of the process. At each step, square root calculation and multiplication are carried out concurrently, and determination of the end flag is made. In a square root calculation process, the value of x register 76 is selected at the first step, and the value of t register 294 is selected at the second step onward as input S of SQRT 294. The calculation result YS is stored in t register 296. At the time point where the process of the mth step ends, the value of x to the $0.5^m$th power is stored in t register 296.

At the second step and et seq., a multiplication process is also carried out. In a multiplication process, determination is made whether the bit is 1 or not from the MSB (e<0>) of e register 290 to select inputs S0 and S1 for MPY 302. At the second step, 1 is selected as S1. As S0, 1 is selected if e<0>=0, and the value of t register 296 storing the value of x to the 0.5 is selected if e<0>=1. At the kth step (k≧3), the value of y register 80 is selected for S0. For S1, 1 is selected if e<k–1>=0, and the value of t register 296 in which the value of x to the $0.5^{k-1}$ is stored is selected if e<k–2>=1.

Simultaneous to the square root calculation and multiplication at the kth step, determination of the end flag is made. If all the values from the (k–1)th bit to the seventh bit of e register 290 are 0, execution processor 270 sets the end flag to 1, and terminates this process at this step.

According to the above execution processor 270, MPY 302 and SQRT 294 are connected in series to repeatedly calculate the square root of the input value at SQRT 294. Simultaneously, control is provided whether to select the calculated result as the input of MPY 302 according to the bit check of e register 290. Thus, power calculation with a decimal exponent can be carried out at high speed.

Fourth Embodiment

An execution processor 370 according to a fourth embodiment of the present invention will be described hereinafter with reference to FIGS. 17–20.

Execution processor 370 of the fourth embodiment corresponds to the execution processor of FIG. 12, and employs an execution unit 372 instead of execution unit 272, an execution unit controller 374 instead of execution unit controller 274, a power calculation controller 376 instead of power calculation controller 276, a MPYU 378 instead of MPYU 280, a SQRTU 380 instead of SQRTU 278, a register file 371 instead of register file 54, and an e register 390 instead of e register 290.

Register file 371 includes an x register 76 for storing base data, and an e register 390 for dividing and storing real number exponent data into an integer region ei and a decimal fraction region ef.

Execution unit controller 374 includes a power calculation controller 376 receiving an instruction from sequence controller 46 to provide control to divide the real number exponent stored in e register 390 into an integer exponent and a decimal exponent for power calculation, and to transmit an end flag indicating the end of a power calculation to sequence controller 46. The remaining components are similar to those shown in FIG. 12. Corresponding components have the same reference characters allotted, and description thereof will not be repeated.

Referring to FIG. 17, SQRTU 380 includes a SQRT 294 for obtaining the square root of input data S and providing a result YS, a ts register 396 connected to SQRT 294 for storing calculation result YS of SQRT 294 according to a write enable signal 404 output from power calculation controller 376, and a square root calculation input selector 408 receiving outputs of x register 76 and ts register 396 for selecting one of the two outputs according to a square root calculation input select signal 410 output from power calculation controller 376 and providing the same to SQRT 294 as input data S.

MPYU 380 includes a MPY 74 for obtaining the product of two input data S01 and S11 to output a result Y1, a ym register 392 connected to MPY 74 for storing calculation result Y1 of MPY 74 according to a write enable signal 402 output from power calculation controller 376, a tm register 394 connected to MPY 74 for storing calculation result Y1 of MPY 74 according to a write enable signal 400 output from power calculation controller 376, a first multiplication input selector 395 receiving outputs of ym register 392, x register 76, fixed value 1, and tm register 394 for selecting one of the four outputs according to a multiplication input select signal 391 output from power calculation controller 376 to provide the same to MPY 74 as input data S01, a second multiplication input selector 393 receiving outputs of x register 76, fixed value 1, and tm register 394 for selecting one of the three outputs according to a multiplication input select signal 391 output from power calculation control unit 376 to provide the same to MPY 74 as input data 511, a MPY 302 obtaining the product of two input data S02 and S12 and providing a result Y2, a y register 80 connected to MPY 302 for storing calculation result Y2 of MPY 302 according to a write enable signal 71 output from power calculation controller 376, an f register 82 connected to MPY 302 for storing an operation flag F of MPY 302 according to a write enable signal 75 output from power calculation controller 376, a multiplication input selector 397 receiving an output of ts register 396 and fixed value 1 for selecting one of the two outputs according to a multiplication input select signal 406 output from power calculation controller 376 and providing the same to MPY 302 as input data S02, and a multiplication input selector 398 receiving outputs of ym register 392 and y register 80 for selecting one of the two outputs according to a multiplication input select signal 406 to provide the same to MPY 302 as input data S12.

Operation flag F is similar to that described in the first embodiment. Description thereof will not be repeated.

Figure 18:
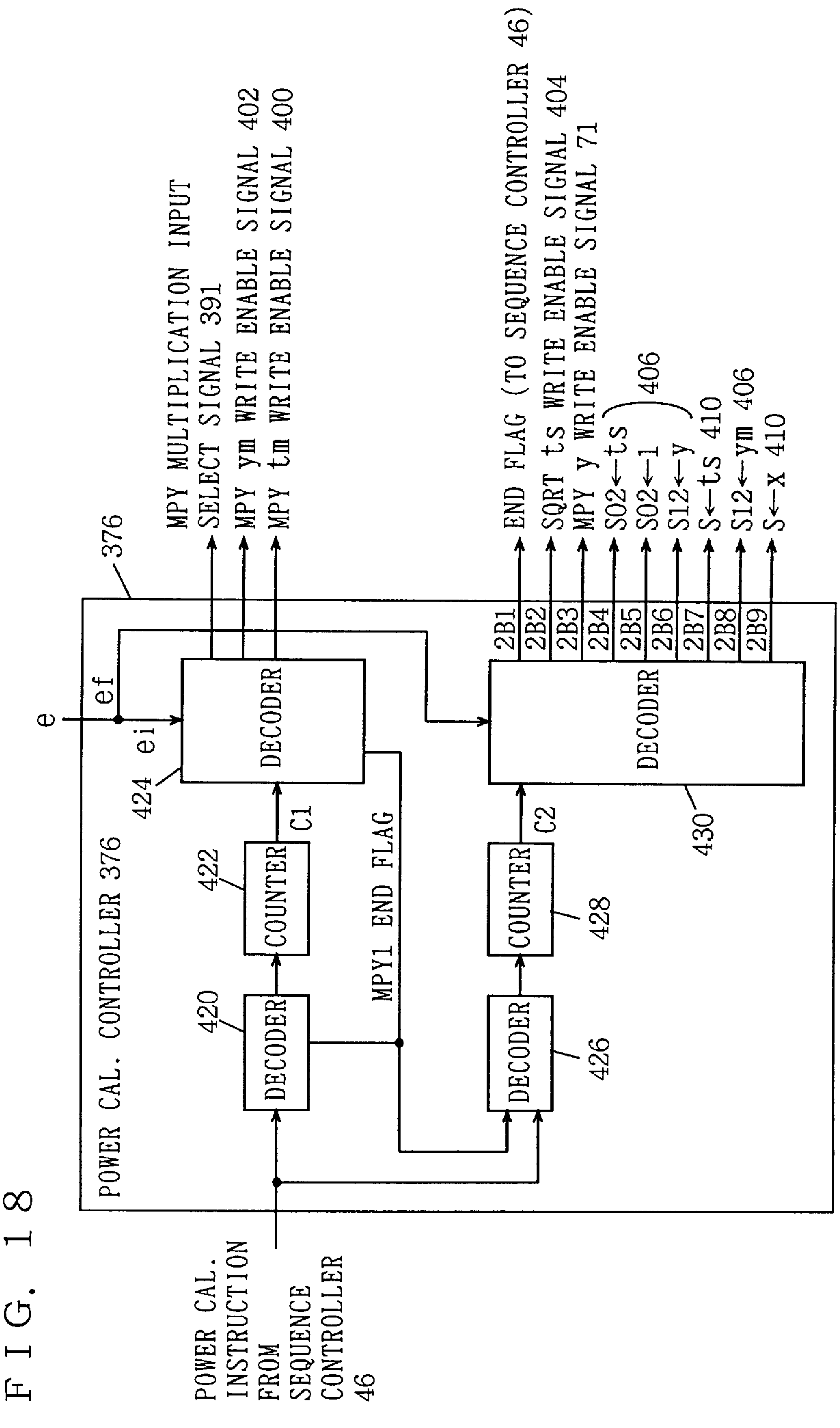
FIG. 18 is a block diagram of a power calculation controller 376 according to the fourth embodiment of the present invention.

Referring to FIG. 18, power calculation controller 376 includes a decoder 420, a counter 422, a decoder 424, a decoder 426, a counter 428, and a decoder 430. Decoder 420 receives a power calculation instruction from sequence controller 46 and an end flag from decoder 424 to provide control of counter 422. Counter 422 receives a signal from decoder 420 to set count value C1 for the control of a repetitive process that will be described afterwards. Decoder 424 receives count value C1 output from counter 422 and the value in integer region ei of e register 390 to check each bit of ei while providing a multiplication input select signal 391 to select input data S01 and S11 of MPY 74. Also, write enable signals 402 and 400 for writing calculation result Y1 of MPY 74 to ym register 392 and tm register 394 are output. Also, an end flag indicating the end of the process is transmitted to decoder 420 and decoder 426. Decoder 426 receives an end flag and a power calculation instruction from sequence controller 46 to provide control of counter 428. Counter 428 receives a signal from decoder 426 to set count value C2. Decoder 430 receives count value C2 output from counter 428 and the value in decimal fraction region ef of e register 390 to check each bit of ef while providing a square root calculation input select signal 410 to select input data S of SQRT 294 and a multiplication input select signal 406 to select input data S02 and S12 of MPY 302. Also, a write enable signal 404 to write calculation result YS of SQRT 294 to ts register 396, a write enable signal 71 to write calculation result Y2 of MPY 302 to y register 80, and a write enable signal 75 to write operation flag F of MPY 302 to f register 82 are output. Furthermore, an end flag indicating the end of the process is transmitted to sequence controller 46.

Decoder 424 has a structure corresponding to that of decoder 94 of FIG. 7, and employs the value in integer region ei of e register 390 instead of the value of e register 78, output C1 of counter 422 instead of output C of counter 92, a write enable signal 402 to ym register 392 for the value of signal line 2A2, a write enable signal 400 to tm register 394 for the value of signal line 2A3, and a multiplication input signal 391 to be provided to multiplication input selectors 395 and 393 to select inputs S01 and S11 of MPY 74 for the values from signal lines 2A4 to 2A*a*. Multiplication input select signal 391 includes a select signal to select the value of tm register 394 as S00, a select signal to select the value of ym register 392 as S00, a signal to select the value of x register 76 as S00, a select signal to select fixed value 1 as S00, a select signal to select the value of tm register 394 as S01, a select signal to select the value of x register 76 as S01, and a select signal to select fixed value 1 as S01, corresponding to signal lines 2A7, 2A8, 2A9, 2A*a*, 2A4, 2A5 and 2A6, respectively.

Decoder 430 has a structure corresponding to that of decoder 324 of FIG. 14, and employs a value of decimal fraction region ef of e register 390 instead of the value of e register 290, output C2 of counter 428 instead of output C of counter 322, a write enable signal 404 to ts register 396 as the value of signal line 2B2, a multiplication input signal 406 applied to multiplication input selectors 397 and 398 to select inputs S02 and S12 of MPY 302 for the values from signal lines 2B4 to 2B7, and a square root calculation input select signal 410 applied to square root calculation input selector 408 to select input S of SQRT 294 for the values of signal lines 2B8 and 2B9. Multiplication input select signal 397 includes a select signal to select the value of ts register 396 as S02, a select signal to select fixed value 1 as S02, a select signal to select the value of y register 80 as S12, and a select signal to select the value of ym register 392 as S12, corresponding to signal lines 2B4, 2B5, 2B6 and 2B7, respectively. Square root calculation input select signal 410 includes a select signal to select the value of x register 76 as S and a select signal to select the value of ts register 396 as S, corresponding to signal lines 2B9 and 2B8, respectively.

The operation of each component will be described hereinafter.

Power calculation controller 376 receives a power calculation instruction from sequence controller 46 at decoders 420 and 426 to output a count value C1 of power calculation corresponding to the value in integer region ei of e register 390 from counter 422, and a count value C2 of power calculation corresponding to the value of decimal fraction region ef in e register 390 from counter 428. Counter 428 initiates counting in response to decoder 426 receiving an end flag from decoder 424.

The operations of decoders 424 and 430 are similar to those of decoders 94 and 324. Description thereof will not be repeated.

The process flow of execution processor 370 will be described hereinafter with reference to FIGS. 19 and 20. It is assumed that integer region ei and decimal fraction region ef of e register 390 each have a 8-bit format. Count value C1 output from counter 422 corresponds to the number of steps of the process. The number of steps of the process corresponds to count value C2 output from counter 428 plus 14. In execution processor 370, the value of x register 76 is x, the value of e register 309 is e, the value of integer region ei of e register 390 is ei, and the value of decimal fraction region ef of e register 390 is ef. From step 1 to step 15, $x^{ei}$ is obtained, and the calculated value is stored in ym register 392. From step 15 to step 23, $x^{ef}$ is obtained. At that time, value $x^{ei}$ stored in ym register 392 is multiplied by $x^{ef}$, and the calculated value $x^{ei+ef}(=x^{e})$ is stored in y register 80.

Figure 8:
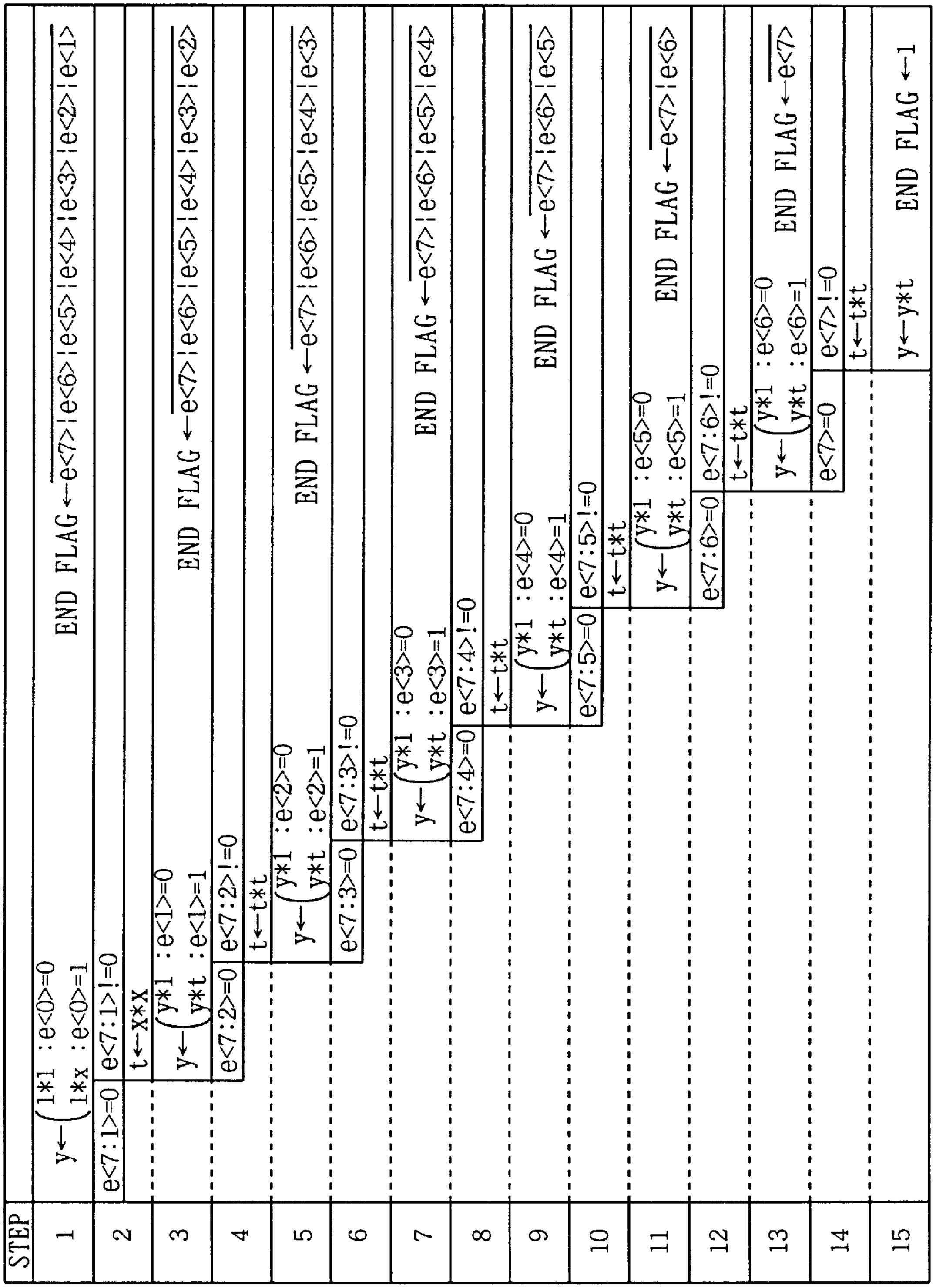
FIG. 8 is a flow chart showing a power calculation process according to the first embodiment of the present invention.

The process from step 1 to step 15 is similar to that of FIG. 8. The process from step 15 to step 23 is similar to that of FIG. 16. Description thereof is already provided with reference to FIGS. 8 and 16, and will not be repeated here. It is to be noted that the value of ym register 392 is used instead of fixed value 1 for S12 at step 16 for the purpose of multiplying S02 by $x^{ei}$.

According to execution processor 370 of the fourth embodiment, power calculation is divided into integer power calculation and decimal power calculation. Respective calculations are carried out simultaneously and concurrently by different calculation units. The result is raised to the power by a multiplier. The operation is controlled according to the bit check of the exponent data which is a real number to effect power calculation with a real number as the exponent at high speed.

Fifth Embodiment

An execution processor 440 according to a fifth embodiment of the present invention will be described hereinafter with reference to FIGS. 21–24.

Execution processor 440 of the fifth embodiment corresponds to that of FIG. 12, and employs an execution unit 442 instead of execution unit 272, an execution unit controller 444 instead of execution unit controller 274, a power calculation controller 446 instead of a power calculation controller 276, a MPYU 448 instead of MPYU 280, a SQRTU 380 instead of SQRTU 278, and a register file 371 instead of register file 54.

Execution unit controller 444 includes a power calculation controller 376 receiving an instruction from sequence controller 46 to provide control to divide the real number exponent into an integer exponent and a decimal exponent for power calculation, and to transmit an end flag indicating the end of a power calculation to sequence controller 46. The remaining components are similar to those of FIG. 12. Corresponding components have the same reference characters allotted, and detailed description thereof will not be repeated.

Figure 21:
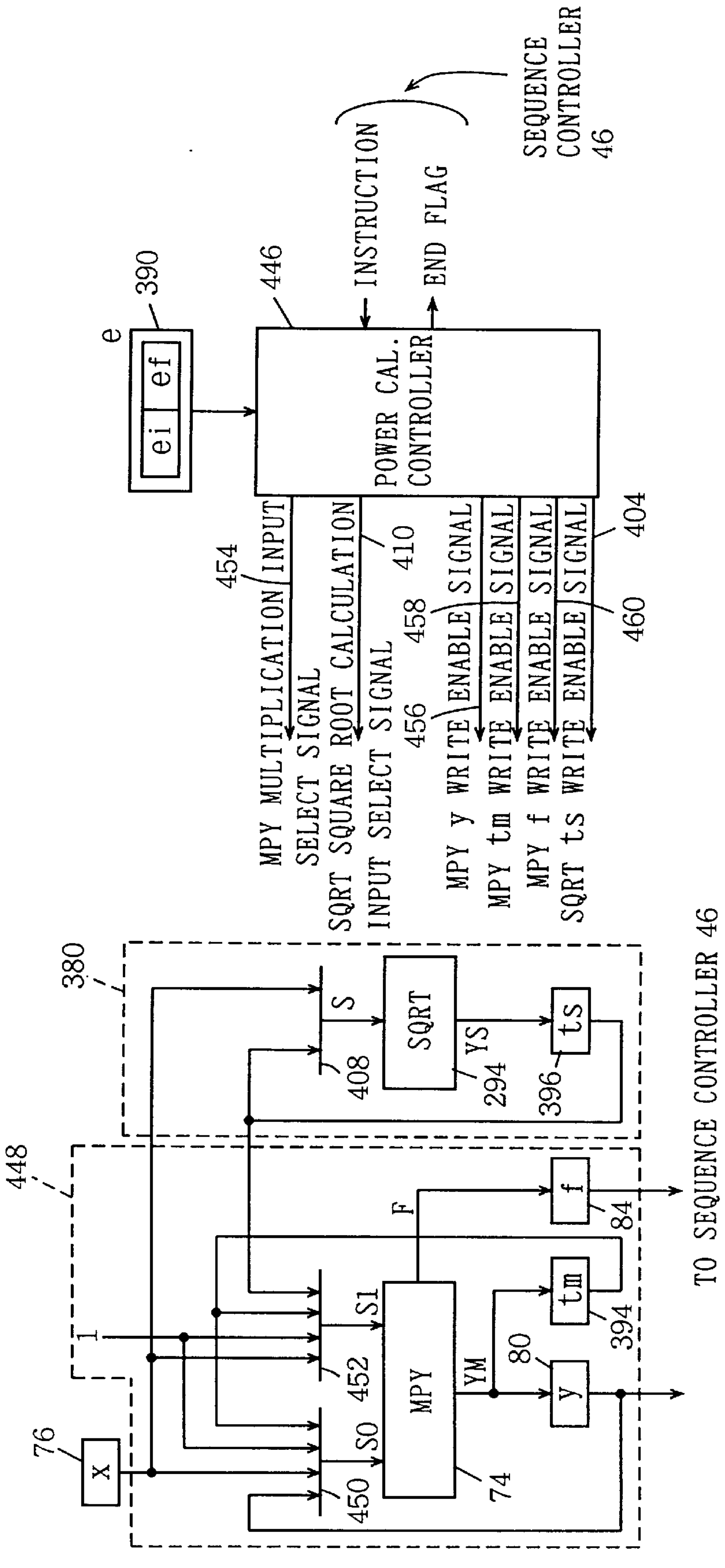
FIG. 21 is a block diagram of an execution unit 442 according to a fifth embodiment of the present invention.

Referring to FIG. 21, MPYU 448 includes a MPY 74 obtaining the product of two input data S0 and S1 and providing a result YM, a y register 80 connected to MPY 74 for storing calculation result YM of MPY 74 according to a write enable signal 456 output from power calculation controller 446, a tm register 394 connected to MPY 74 to store calculation result YM of MPY 74 according to a write enable signal 458 output from power calculation controller 446, an f register 84 connected to MPY 74 for storing operation flag F of MPY 74 according to a write enable signal 460 output from power calculation controller 446, a multiplication input selector 450 receiving outputs of y register 80, x register 76, fixed value 1, and t register 394 for selecting one of the four outputs according to a multiplication input select signal 454 output from power calculation controller 446 to provide the same to MPY 74 as input data S0, and a multiplication input selector 452 receiving outputs of x register 76, fixed value 1, tm register 394 and ts register 396 for selecting one of four outputs according to a multiplication input select signal 454 output from power calculation controller 446 to provide the same to MPY 74 as input data S1.

SQRTU 380 has a structure similar to that of the fourth embodiment. Therefore, description thereof will not be repeated.

Figure 22:
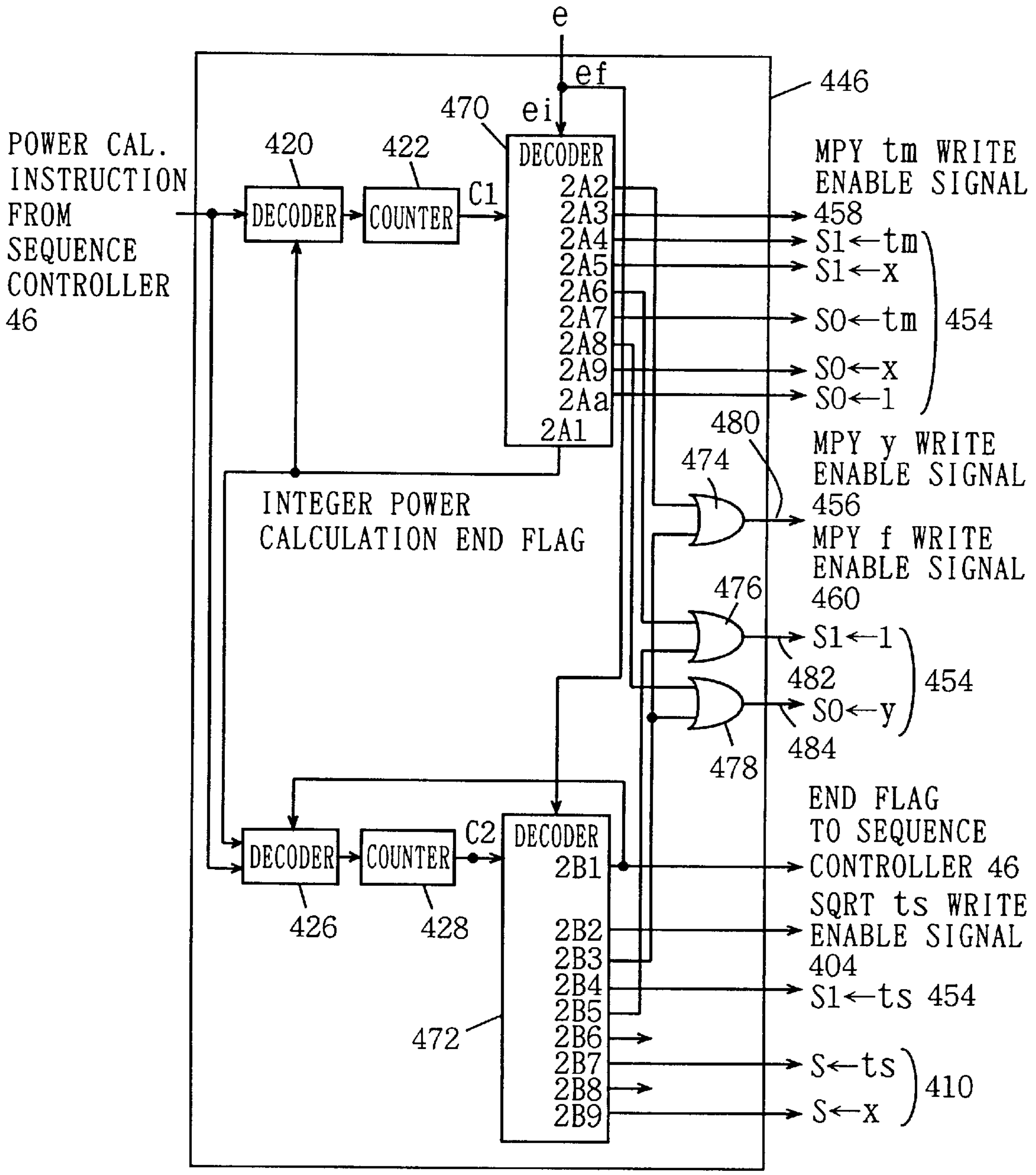
FIG. 22 is a block diagram of a power calculation controller 446 according to the fifth embodiment of the present invention.

Referring to FIG. 22, power calculation controller 446 includes decoders 420, 426, 470 and 472, counters 422 and 428, and OR gates 474, 476 and 478. Decoder 420 receives a power calculation instruction from sequence controller 46 to provide control of counter 422. Counter 422 receives a signal from decoder 420 to set count value C1. Decoder 470 receives count value C1 output from counter 422 and the value in integer region ei of e register 390 to check each bit of ei while providing a multiplication input select signal 454 to select input data S0 and S1 of MPY 74. Decoder 470 also provides a write enable signal 458 to write calculation result YM of MPY 74 to tm register 394. Decoder 470 also transmits an end flag indicating the end of the process to decoder 426. Decoder 426 receives an end flag and a power calculation instruction from sequence controller 46 to provide control of counter 428. Counter 428 receives a signal from decoder 426 to set count value C2. Decoder 472 receives count value C2 output from counter 428 and the value in decimal fraction region ef of e register 390 to check each bit of ef while providing a square root calculation input select signal 410 to select input data S of SQRT 294 and a multiplication input select signal 454 to select input data S1 of MPY 74. Decoder 472 also provides a write enable signal 404 to write calculation result YS of SQRT 294 to ts register 396. Decoder 472 also transmits an end flag indicating the end of the process to sequence controller 46.

OR gate 474 receives signals output from decoders 470 and 472 to output a write enable signal 456 to write calculation result YM of MPY 74 to y register 80 and a write enable signal 460 to write operation flag F of MPY 74 to f register 84 from signal line 480. OR gate 476 receives signals output from decoders 470 and 472 to provide a multiplication input select signal 454 to select input data S1 of MPY 74 from signal line 482. OR gate 478 receives signals output from decoders 470 and 472 to provide a multiplication input select signal 454 to select input data S0 of MPY 74 from signal line 484.

Decoder 470 has a structure corresponding to that of decoder 94 of FIG. 7, and employs the value of integer region ei of e register 390 instead of the value of e register 78, and output C1 of counter 422 instead of output C of counter 92. Decoder 470 provides the value of signal line 2A1 as the value of the end flag, the value of signal line 2A2 as the input of OR gate 474, the value of signal line 2A3 as write enable signal 458 to tm register 394, the value of signal line 2A4 as the select signal to select the value of tm register 394 for S1, and the value of signal line 2A5 as the select signal to select the value of x register 76 for S1. Furthermore, decoder 470 provides the value of signal line 2A6 as the input of OR gate 476, the value of signal line 2A7 as the signal to select the value of tm register 394 for S0, the value of signal line 2A8 as the input of OR gate 478, the value of signal line 2A9 as the select signal to select the value of x register 76 for S0, and the value of signal line **2A*a* as the select signal to select a fixed value 1 for S0**.

Decoder 452 has a structure corresponding to that of decoder 324 of FIG. 14, and employs the value of decimal fraction region ef of e register 390 instead of the value of e register 290, and output C2 of counter 428 instead of output C of counter 322. Decoder 452 provides the value of signal line 2B2 as write enable signal 404 to ts register 396, the value of signal line 2B3 as the input of OR gate 474, the value of signal line 2B4 as the select signal to select the value of ts register 396 for S1, the value of signal line 2B5 as the value of OR gate 476, and the value of signal line 2B7 as the select signal to select the value of ts register 396 for S. Decoder 452 does not use the values of signal lines 2B6 and 2B8.

Multiplication input select signal 454 output from power calculation controller 446 includes the values of the above-described signal lines 2A4, 2A5, 2A7, 2A9, 2Aa, 2B4, 482 and 484. Square root calculation input select signal 410 output from power calculation controller 446 includes the values of the above-described signal lines 2B7 and 2B9.

The operation of each component will be described hereinafter. Power calculation controller 446 receives a power calculation instruction from sequence controller 46 at decoders 420 and 426 to output a count value C1 of a power calculation corresponding to the value of integer region ei of e register 390 from counter 422, and a count value C2 of power calculation corresponding to the value of decimal fraction region ef of e register 390 from counter 428.

The operations of decoders 470 and 472 are similar to those of decoders 94 and 324 of FIGS. 7 and 14, respectively. Therefore, description thereof will not be repeated.

The process flow of execution processor 440 will be described hereinafter with reference to FIGS. 23 and 24. It is assumed that integer region ei and decimal fraction region ef of e register 390 each have a 8-bit structure. Count value C1 output from counter 422 corresponds to the number of steps of the process. The number of steps of the process corresponds to count value C2 output from counter 428 plus 14. Here, the value of x register 76 is x, the value of e register 390 is e, the value of integer region ei of e register 390 is ei, and the value of decimal fraction region ef of e register 390 is ef. From step 1 to 15, $x^{ei}$ is obtained, and the calculated value is stored in y register 80. From step 15 to step 23, $x^{ef}$ is obtained. At this time, value $x^{ei}$ stored in y register 80 is multiplied by $x^{ef}$. The calculated result $x^{ei+ef}$ (=$x^e$) is stored in y register 80.

The process from step 1 to 15 is similar to that of the process of FIG. 8. Detailed description thereof will not be repeated.

Figure 16:
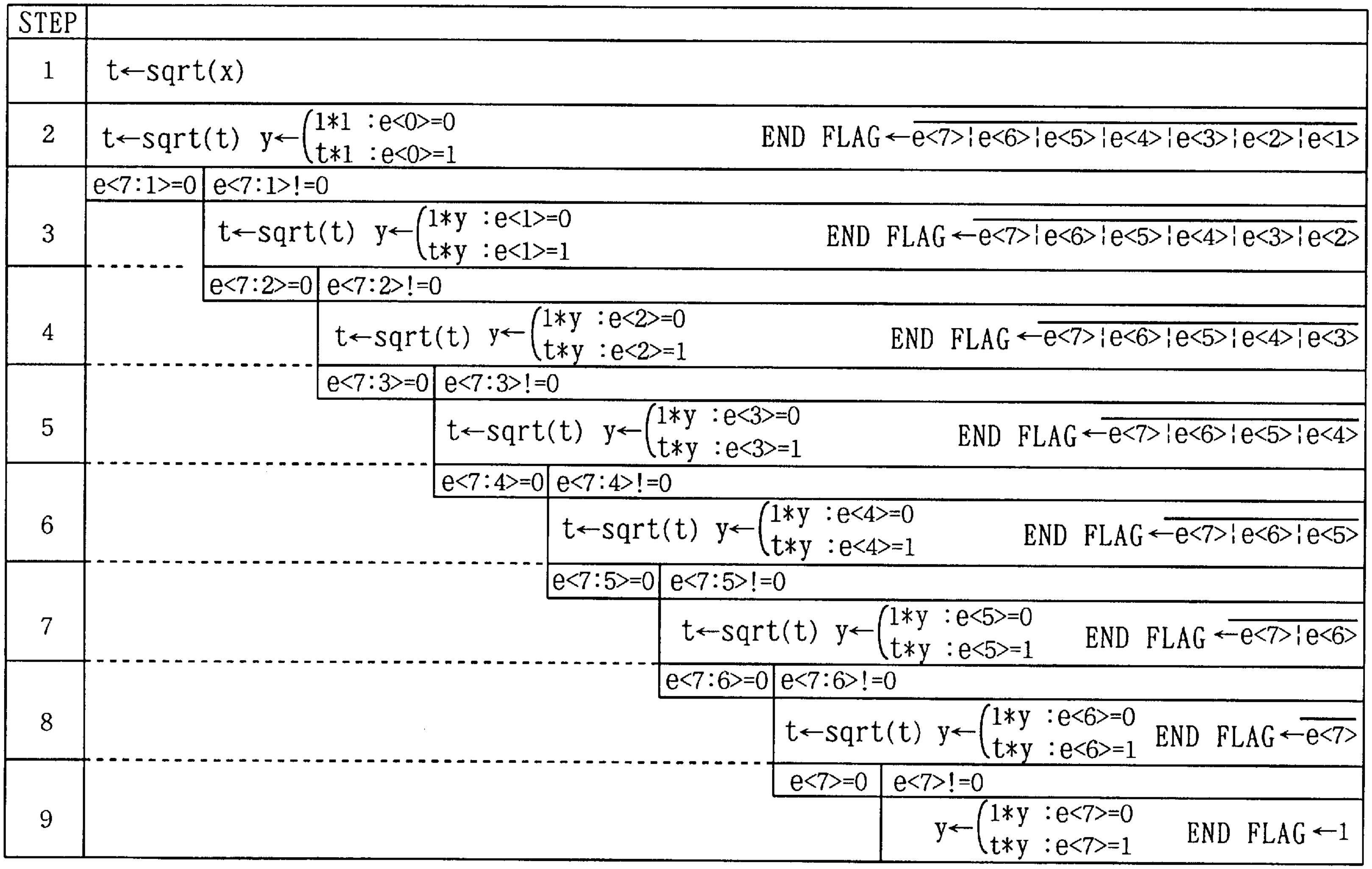

The process from step 16 to step 23 is similar to the process of FIG. 16. Therefore, detailed description thereof will not be repeated. The value of x register 80 is used instead of fixed value 1 for S0 at step 16 for the purpose of multiplying $x^{ei}$ by S1. It is assumed that the MSB of decimal fraction region ef of e register 390 begins from the seventh bit.

According to execution processor 440 of the fifth embodiment, input data of integer power calculation by a multiplier and input data of decimal power calculation by a square root calculation unit are generated concurrently, and execution of power calculation of the integer power calculation result and the square root calculation result using the same multiplier right after completion of integer power calculation is controlled according to the bit check of the exponent data. Thus, power calculation with a real number as the exponent can be carried out at high speed.

Sixth Embodiment

An execution processor 490 according to a sixth embodiment of the present invention will be described hereinafter with reference to FIGS. 25–30.

Execution processor 490 of the sixth embodiment corresponds to that of FIG. 12, and employs an execution unit 492 instead of execution unit 274, an execution unit controller 494 instead of execution unit controller 274, a power calculation controller 496 instead of power calculation control unit 276, a MPYU 448 instead of MPYU 280, a SQRTU 498 instead of SQRTU 278, and a register file 371 instead of register file 54.

Execution unit controller 494 includes a power calculation controller 496 to receive an instruction from sequence controller 46 to divide the real number exponent into an integer exponent and a decimal exponent to control the power calculation.

Figure 25:
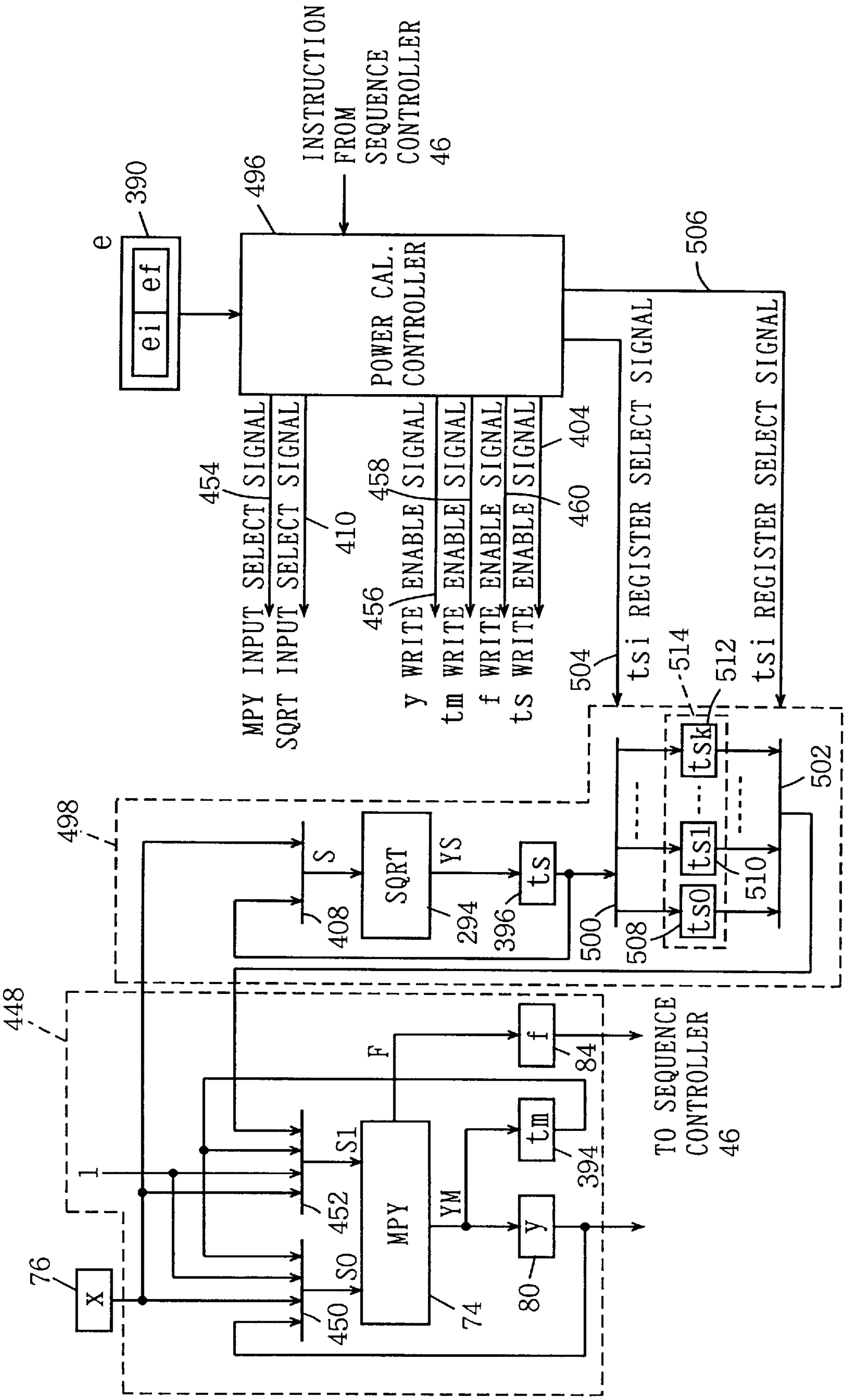
FIG. 25 is a block diagram of an execution unit 492 according to a sixth embodiment of the present invention.

Referring to FIG. 25, SQRTU 498 includes, in addition to SQRTU 380 described in the fourth embodiment, a register group 514 having a plurality of registers to store a plurality of outputs of ts register 396, a register selector 500 for selecting a register of register group 514 to store an output of ts register 396 according to a register select signal 504 output from power calculation controller 496, and a register selector 502 for selecting one register in register group 508 according to a register select signal 506 output from power calculation controller 496 and providing the stored content therefrom. Register group 508 is formed of (k+1) registers including a ts0 register 508, and a ts1 register 510 to a tsk register 512.

The structure of MPYU 448 and register file 371 are similar to those shown in the fifth and fourth embodiments. Therefore, detailed description thereof will not be repeated. The remaining components are similar to those already described in the other embodiments. Corresponding components have the same reference characters allotted, and detailed description thereof will not be repeated.

Figure 26:
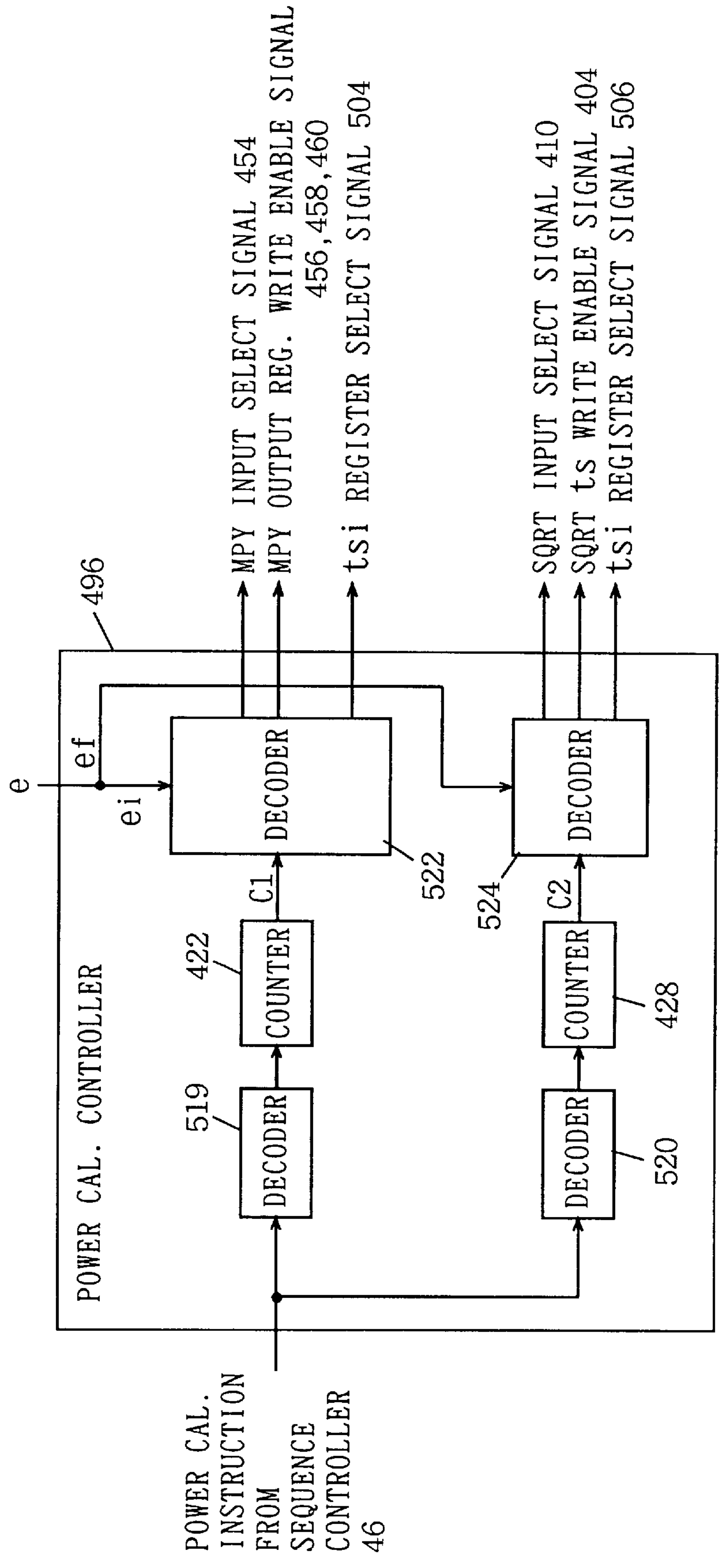
FIG. 26 is a block diagram of a power calculation controller 496 according to the sixth embodiment of the present invention.

Referring to FIG. 26, power calculation controller 496 includes decoders 519, 520, 522 and 524, and counters 422 and 428. Decoder 519 receives a power calculation instruction from sequence controller 46 to provide control of counter 422. Counter 422 receives a signal from decoder 519 to set count value C1. Decoder 522 receives count value C1 output from counter 422 and the value of integer region ei of e register 390 to check each bit of ei while providing a multiplication input select signal 454 to select input data S0 and S1 of MPY 74. Decoder 522 also provides write enable signals 456 and 458 to write calculation result YM of MPY 74 to y register 80 and tm register 394. Decoder 522 also provides a register select signal 504. Decoder 520 receives a power calculation instruction from sequence controller 46 to provide control of counter 428. Counter 428 receives a signal from decoder 520 to set count value C2. Decoder 524 receives count value C2 from counter 428 and the value in decimal fraction region ef of e register 390 to check each bit of ef while providing a square root calculation input select signal 410 to select input data S of SQRT 294. Decoder 520 also provides a write enable signal 404 to write calculation result YS of SQRT 294 into ts register 396, and a register select signal 506.

Figure 27:
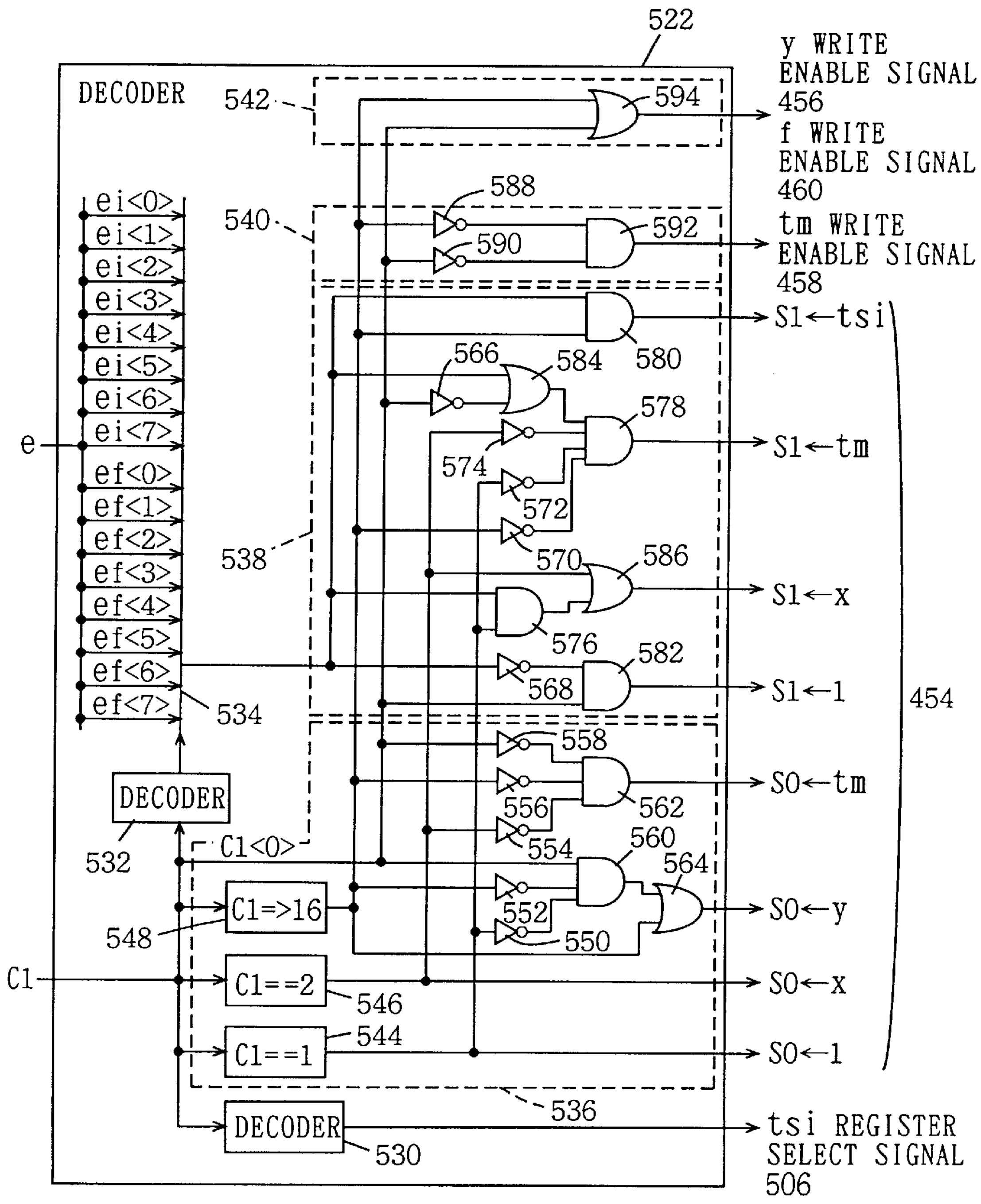
FIG. 27 is a logic circuit diagram of a decoder 522 according to the sixth embodiment of the present invention.

Referring to FIG. 27, decoder 522 includes a first multiplication input select signal generation unit 536 for generating a multiplication input select signal 454 to select input data S0 of MPY 74, a second multiplication input select signal generation unit 538 for generating a multiplication input select signal 454 to select input data S1 of MPY 74, a first write enable signal generation unit 540 for generating write enable signal 458, a second write enable signal generation unit 542 for generating write enable signals 456 and 460, a decoder 532 to output a signal according to the value of counter 422, and an exponent bit data selector 534 for providing a value of a specified bit in e register 390 according to a signal output from decoder 532.

First multiplication input select signal generation unit 536 includes a comparator 544 connected to counter 422 for comparing count value C1 with 1 to provide 1 and 0 when count value C1 is 1 and a value other than 1, respectively, a comparator 546 connected to counter 422 to compare count value C1 with 2 to provide 1 and 0 when count value C1 is 2 and a value other than 2, respectively, a comparator 548 connected to counter 422 to output 1 when count value C1 is 16 and greater, and output 0 when C1 is 15 or smaller, a NOT gate 550 connected to comparator 544, a NOT gate 554 connected to comparator 546, NOT gates 552 and 556 connected to comparator 548, an AND gate 560 connected to NOT gates 550 and 552 and to counter 422 for obtaining the logical product of output values of NOT gates 550 and 552 and the value of the zeroth bit of count value C1 and providing the ANDed value, an AND gate 562 connected to NOT gates 554, 556 and 558, and an OR gate 564 connected to comparator 548 and to AND gate 560.

Second multiplication input select signal generation unit 538 includes a NOT gate 568 connected to exponent bit data selector 534, a NOT gate 566 connected to counter 422 for obtaining a NOT value of the value of the zeroth bit of count value C1 and providing the value thereof, a NOT gate 570 connected to comparator 548, a NOT gate 572 connected to comparator 544, a NOT gate 574 connected to comparator 546, an AND gate 582 connected to counter 422 and NOT gate 568 for providing a logical product of output values thereof, an AND gate 576 connected to comparator 544 and exponent bit data selector 534, an OR gate 586 connected to AND gate 576 and comparator 546, an OR gate 584 connected to NOT gate 566 and exponent bit data selector 534, an AND gate 578 connected to NOT gates 570, 572, 574 and OR gate 584, and an AND gate 580 connected to comparator 578 and exponent bit data selector 534.

First write enable signal generation unit 540 includes a NOT gate 590 connected to counter 422 for obtaining a NOT value of the value of the zeroth bit of count value C1 and providing the value thereof, a NOT gate 588 connected to comparator 548, and an AND gate 592 connected to NOT gates 588 and 590.

Second write enable signal generation unit 542 includes an OR gate 594 connected to counter 422 and comparator 548 to obtain the logical sum of the value of the zeroth bit of count value C1 and the output value of comparator 548, and providing the value thereof.

Referring to FIG. 28, decoder 524 includes a comparator 600 connected to counter 428 to compare count value C2 with 1 to output 1 and 0 when C2 is 1 and a value other than 1, respectively, a NOT gate 602 connected to comparator 600, a comparator 604 connected to counter 428 to compare count value C2 with 0 to output 1 and 0 when C2 is a value other than 0 and 0, respectively, and a decoder 606 connected to counter 428 to output various register select signal 504 according to count value C2.

The operation of each component will be described hereinafter. Integer region ei and decimal fraction region ef of e register 390 each have a 8-bit structure.

Power calculation controller 496 receives a power calculation instruction from sequence controller 46 at decoders 519 and 520 to output a count value C1 indicating the number of operations of MPY 74 from counter 422 and used for controlling the operation, and to output a count value C2 indicating the number of operations of SQRT 294 from counter 428 and used for controlling the operation.

The operation of decoder 530 will be described hereinafter. It is assumed that the number of registers in register group 508 is 8. When count value C1 is 16 or greater, decoder 530 selects the (C1-16)th register from register group 514, and provides to register selector 502 a register select signal 506 to output the value thereof.

The operation of decoder 532 and exponent bit data selector 534 will be described hereinafter. Decoder 532 receives count value C1 to provide a signal to output the value of each bit of e register 390 from exponent bit data selector 534. That signal serves to output the value of the {(C1-1)/2}th bit in integer region ei of e register 390 when count value C1 is 1 to 15 and to output the value of the (23-C1)th bit of decimal fraction region ef of e register 390 when count value C1 is 16 to 23.

The operation of first multiplication input select signal generation unit 536 will be described hereinafter. AND gate 560 provides a value of 1 when count value C1 is an odd number less than or equal to 15 and not 1. OR gate 564 provides a 1 output when count value C1 is 16 or greater, or when the output of AND gate 560 is 1. AND gate 562 provides a 1 output when count value C1 is an even number smaller than 15 and not 2. Therefore, first multiplication input select signal generation unit 536 provides a signal to select 1 for S0 when count value C1 is 1, and to select the value of x register 76 for S0 when count value C1 is 2. First multiplication input select signal generation unit 536 provides a signal to select the value of y register 80 for S0 when count value C1 is 16 or greater, or an odd number from 3 to 15. Also, a signal is output to select y register 80 for S0 when count value C1 is an even number from 4 to 14.

The operation of second multiplication input select signal generation unit 538 will be described hereinafter. AND gate 582 provides a 1 output when count value C1 is an odd number and the value output from exponent bit data selector 534 is 0. AND gate 576 provides a 1 output when the value output from exponent bit data selector 534 is 1 and count value C1 is 1. OR gate 586 provides a 1 output when the output of AND gate 576 is 1 or when count value C1 is 2. OR gate 584 provides a 1 output when the value output from exponent bit data selector 534 is 1, or when count value C1 is an even number. AND gate 578 provides a 1 output when the output of OR gate 584 is 1, count value C1 is a value other than 2, and count value C1 is a value other than 1 and not more than 15. Therefore, second multiplication input select signal generation unit 538 provides a signal to select a fixed value 1 as S1 when count value C1 is an odd number and the value output from exponent bit data selector 534 is 0. Second multiplication input select signal generation circuit 538 provides a signal to select the value of x register 76 as S1 when count value C1 is 1 and the value output from exponent bit data selector 534 is 1, or when count value C1 is 2. Second multiplication input select signal generation unit 538 provides a signal to select the value of tm register 394 for S1 when count value C1 is an odd number from 3 to 15 and the value output from exponent bit data selector 534 is 1, or when count value C1 is an even number from 3 to 14. Second multiplication input select signal generation unit 538 also provides a signal to select the output from register selector 502 as S1 according to register select signal 506 when count value C1 is at least 16 and the value output from exponent bit data selector 534 is 1. Multiplication input select signal 454 generically indicates the signal output from first and second multiplication input select signal generation units 536 and 538.

The operation of first write enable signal generation unit 540 will be described hereinafter. AND gate 592 provides an output of 1 when count value C1 is an even number less than 15. Therefore, first write enable signal generation unit 540 renders write signal 458 active when count value C1 is an even number of 14 and below.

The operation of second write enable signal generation unit 542 will be described hereinafter. OR gate 594 provides an output of 1 when count value C1 is at least 16, or when count value C is odd number. Therefore, second write enable signal generation unit 542 renders write enable signals 456 and 460 active when the aforementioned condition is satisfied.

The operation of decoder 524 will be described hereinafter. Referring to FIG. 28, decoder 606 provides a register select signal 504 to select the (C2-2)th register from register group 514 as the register to write in the output of ts register 396 when count value C2 is at least 2 and not more than 9. Decoder 606 provides a signal to select the value of x register 76 as S when count value C2 is 1. When count value C2 takes a value other than 1, the signal to select the value of ts register 396 is output as S. Square root calculation input select signal 410 generically refers to these two signals. When count value C2 is at least 1, write enable signal 404 is rendered active.

The process flow of execution processor 490 will be described with reference to FIG. 29. The value of x register 76 is x, the value of e register 390 is e, the value of integer region ei of e register 390 is ei, and the value of decimal fraction region ef of e register 390 is ef. Count value C1 output from counter 422 and count value C2 output from counter 424 correspond to the number of steps of the process. Count value C1 indicates the number of operations in MPY 74, and count value C2 indicates the number of operations in SQRT 294.

From step 1 to step 23, multiplication is carried out by MPY 74 according to various signals output from decoder 522. From step 1 to step 9, square root calculation is carried out by SQRT 294 according to various signals for input/output from decoder 524.

By the multiplication in MPY 74 from step 1 to step 15, $x^{ei}$ is obtained. The process flow is similar to that of FIG. 8 excluding the portion corresponding to the end flag. Therefore, description thereof will not be repeated.

By the square root calculation of SQRT 294 from step 1 to step 9, intermediate data required for calculation of $x^{ef}$ is obtained and stored in each register in register group 514. At the stage where the process up to step 9 is completed, ts0 register 508, ts1 register 510, ts2 register, ts3 register, ts4 register, ts5 register, ts6 register and ts7 register hold the values of $x^{1/2}$, $x^{1/4}$, $x^{1/8}$, $x^{1/16}$, $x^{1/32}$, $x^{1/64}$, $x^{1/128}$, and $x^{1/256}$, respectively. In the multiplication from step 16 to step 23, respective intermediate data stored in respective registers are sequentially read out to carry out computation to obtain $x^{ef}$. The process flow is similar to that described in FIG. 16 excluding the portion corresponding to the end flag and the square root calculation. Therefore, description thereof will not be repeated. It is assumed that the MSB of decimal fraction region ef of e register 390 begins from the seventh bit. The value of a register in register group 510 output by register selector 502 according to register select signal 506 is used instead of the value of t register 296 in FIG. 16. Also, the value of y register 80 is used instead of fixed value 1 as S0 at step 16 for the purpose of multiplying S1 by $x^{ei}$.

The case is considered where the process of SQRT 294 takes two times the time for the process of MPY 74 with reference to FIG. 30. It is typical of the SQRT to be more time consuming than the MPY. The data required for the process subsequent to step 15 is already calculated by SQRT 294. Therefore, there is no much difference in the total computation time. The value stored in the ts0 register at the time point when the last square root calculation is terminated will not be used thereafter. Therefore, the result of the last square root calculation is stored in the ts0 register. This means that the number of registers in register group 508 can be reduced by 1 as a secondary advantage.

According to execution processor 490 of the sixth embodiment, the integer power calculation by MPY 74 and the input data generation for the decimal power calculation by SQRT 294 are carried out concurrently, and the input data thereof is stored in register group 514. Following completion of the integer power calculation, control is provided of the multiplication of the integer power calculation result and the value stored in register group 514 using MPY 74 according to the bit check of the exponent data. Therefore, power calculation of a real number exponent can be carried out at high speed. The total time for processing does not change even when the time required for square root calculation is greater than that required for multiplication.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An execution processor comprising:

a first register for storing base data, a second register for dividing and storing exponent data into an integer region and a decimal fraction region, a multiplier including first and second inputs, third and fourth registers for storing a calculation result of said multiplier, a square root calculation unit, a fifth register for storing a calculation result of said square root calculation unit, a first input selector receiving an output of said first register, an output of said third register, an output of said fourth register, and a fixed value 1 for selecting any one of the received outputs according to a first input select signal to provide the same to said first input of said multiplier, a second input selector receiving an output of said first register, an output of said fourth register, an output of said fifth register, and a fixed value 1 for selecting any one of the received outputs to provide the same to said second input of said multiplier, a third input selector receiving an output of said first register and an output of said fifth register for selecting one of the received outputs according to a third input select signal to provide the same to an input of said square root calculation unit, and a power calculation controller checking said integer region of said exponent data for each bit while providing said first input select signal, said second input select signal, and a write enable signal to allow data writing to said third or fourth register according to the number of checking times and a value of a relevant bit, and checking said decimal fraction region of said exponent data for each bit while providing said first input signal, said second input signal, said third input signal, and a write enable signal to allow data writing to said third or fifth register according to the number of checking times and a value of a relevant bit.

2. The execution processor according to claim 1, wherein said multiplier further provides flag data indicating status of a calculation result of said multiplier, said execution processor further comprising a status register for storing said flag data, wherein said power calculation controller provides control to write said flag data output from said multiplier to said status register.

3. The execution processor according to claim 2, wherein said flag data includes a zero flag indicating that a calculation result of said multiplier is 0, and/or an overflow flag indicating that the calculation result of said multiplier exceeds a data region of a representation range.

4. The execution processor according to claim 3, wherein said power calculation controller ends a process when a result of a predetermined operation between predetermined bits of said exponent data is a predetermined value, and provides flag data indicating an end of the process.

5. The execution processor according to claim 4 wherein said predetermined bits are bits more significant than the relevant bit, said predetermined operation is a logical sum between bits, and said predetermined value is 0.

* * * * *